US012793086B2

(12) United States Patent
Wen et al.

(10) Patent No.: US 12,793,086 B2
(45) Date of Patent: Nov. 10, 2026

(54) TELEMETRY DATA BASED COUNTERFEIT DEVICE DETECTION

(71) Applicant: Cisco Technology, Inc., San Jose, CA (US)

(72) Inventors: Shi-Jie Wen, Sunnyvale, CA (US); Dao-I Tony Lin, Pleasanton, CA (US); Ranjani Ram, Chapel Hill, NC (US); Li Sun, Austin, TX (US); James Edwin Turman, Round Rock, TX (US); Anthony Winston, Akron, OH (US); Jie Xue, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 445 days.

(21) Appl. No.: 18/187,520

(22) Filed: Mar. 21, 2023

(65) Prior Publication Data

US 2024/0320691 A1 Sep. 26, 2024

(51) Int. Cl.
*G06Q 30/018* (2023.01)
*H04Q 9/00* (2006.01)

(52) U.S. Cl.
CPC ........... *G06Q 30/0185* (2013.01); *H04Q 9/00* (2013.01)

(58) Field of Classification Search
CPC ............................. G06Q 30/0185; H04Q 9/00
See application file for complete search history.

(56) References Cited

U.S. PATENT DOCUMENTS 7,200,524 B2 * 4/2007 Kang ........................ G05B 9/02
702/182
9,749,718 B1 * 8/2017 Friel ........................ H04Q 9/00
11,645,794 B2 * 5/2023 Sato ................... G05B 23/0216
345/440

(Continued)

FOREIGN PATENT DOCUMENTS

WO WO2022192616 9/2022

OTHER PUBLICATIONS

Dong et al., "Hardware trojans in chips: A survey for detection and prevention". Sensors, 20(18), 5165, Sep. 2020, 37 pgs.

*Primary Examiner* — Oleg Survillo
(74) *Attorney, Agent, or Firm* — Lee & Hayes, P.C.

(57) ABSTRACT

Techniques are described for detecting counterfeit products by identifying differences between hardware components and orientations of the counterfeit products, and hardware components and orientations of authentic products. In some examples, the hardware components and orientations can be identified by generating hardware intrinsic development data based on telemetry data of products (or "devices"). By way of example, the telemetry data may be analyzed by machine learning (ML) models to generate representative models of the hardware intrinsic development data. In various examples, the representative models can include sample representative models of hardware intrinsic development data generated based on valid telemetry data of authentic devices. In those or other examples, the representative models can include other representative models (or "test representative models") of hardware intrinsic develop- (Continued)

ment data generated based on unvalidated telemetry data of test devices. Comparisons between the representative models can be utilized to identify the counterfeit products.

20 Claims, 8 Drawing Sheets

(56) References Cited

U.S. PATENT DOCUMENTS

| | | | | |
|---|---|---|---|---|
| 11,683,246 | B2 * | 6/2023 | Agrawal | H04L 41/142 709/224 |
| 11,792,215 | B1 * | 10/2023 | Atay | G06F 11/3452 726/23 |
| 11,908,811 | B2 * | 2/2024 | Keller, III | G01R 31/2837 |
| 2019/0318837 | A1 * | 10/2019 | Schwartz | G05B 23/0254 |
| 2021/0216632 | A1 * | 7/2021 | Bean | G06F 21/566 |
| 2021/0385233 | A1 * | 12/2021 | Chopra | H04L 63/1416 |
| 2022/0004633 | A1 * | 1/2022 | Wright | G06F 1/28 |
| 2022/0164483 | A1 * | 5/2022 | Weiss | G06F 21/44 |
| 2023/0076346 | A1 * | 3/2023 | Sui | G06F 21/57 |
| 2023/0281186 | A1 * | 9/2023 | Yuan | G06F 16/2365 707/691 |
| 2023/0418948 | A1 * | 12/2023 | Karpovsky | G06F 21/554 |
| 2024/0033571 | A1 * | 2/2024 | James | A63B 21/0058 |
| 2024/0086271 | A1 * | 3/2024 | Neystadt | G06F 11/3447 |

* cited by examiner

TELEMETRY DATA BASED COUNTERFEIT DEVICE DETECTION

TECHNICAL FIELD

The present disclosure relates generally to techniques for detecting whether devices are counterfeit by analyzing telemetry data gathered from the devices. The devices may be authenticated by analyzing the telemetry data with machine learning (ML) models to generate representative data for hardware components and orientations of the devices. Sample representative data associated with genuine devices may be generated and utilized for comparisons with the representative data associated with the devices being authenticated.

BACKGROUND

Modern electronic product suppliers engage in complex and constantly changing and evolving business practices. The product suppliers source components from large numbers of distributors and assemble products with the components. Purchase transactions for the products are carried out via large numbers of vendors. As amounts and varieties of conditions pertaining to manufacture, assembly, distribution, and support of products continue to increase, so do incidents of fraud. Malicious actors may substitute the products with counterfeit products, modify components of the products without authorization, alter the products such as by replacing genuine components of the products with dissimilar components, and so on. Management of anti-counterfeit data associated with the products and/or the components may reduce such occurrences of fraud, in order to minimize costs, increase quality, eliminate security risks, improve device reliability, and/or prevent service delays.

To accomplish this type of anti-counterfeit data management, the product suppliers may store identifier data associated with the products, and/or generate functional data by performing various tests on the products. The identifier data and/or the functional data may be used for verification of unauthenticated products. However, such tactics may be insufficient for reliably being able to distinguish fraudulent products from their genuine counterparts. In general, due to continually increasing levels of sophistication and frequency of malicious and unwarranted tactics utilized to produce counterfeit products, current techniques are unable to provide adequate defenses against counterfeiting.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
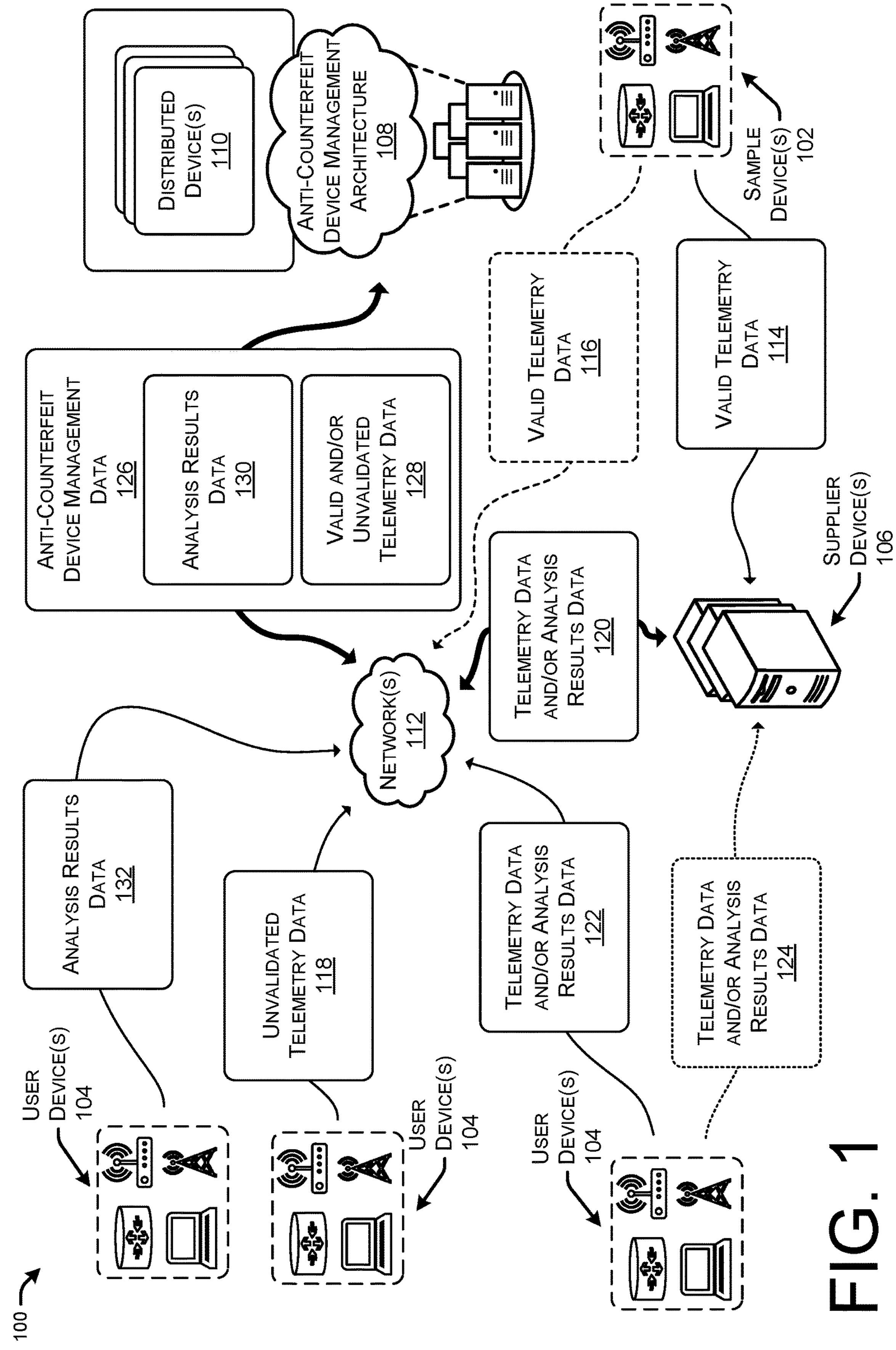
FIG. 1 illustrates an example topology of a computing and network architecture for comparing valid telemetry data received from one or more sample devices, with unvalidated telemetry data received from one or more user devices, for anti-counterfeit device management.

This disclosure describes techniques for controlling computing systems to analyze hardware components and orientations of devices to detect whether the devices are counterfeit. An example method includes inputting unvalidated telemetry data of the devices into machine learning (ML) models to generate representative models of hardware intrinsic development data. In some cases, sample representative models of hardware intrinsic development data are generated based on valid telemetry data of authentic devices. The devices can be authenticated based on comparisons between the representative models generated based on the unvalidated telemetry data, and the sample representative models generated based on the valid telemetry data.

The method may further include utilizing the unvalidated telemetry data associated with the devices to generate test representative models associated with test devices. In some instances, utilizing the unvalidated telemetry data includes: receiving sensor input by sensors of the test devices; generating the unvalidated telemetry data by the test device sensors based on the sensor input and/or sensor output; analyzing the unvalidated telemetry data by the ML models; and outputting, by the ML models, test representative models of hardware intrinsic development data based on the unvalidated telemetry data.

In some cases, the method may further include utilizing valid telemetry data associated with sample devices that are authentic devices to authenticate the test devices. In some instances, utilizing the valid telemetry data includes: receiving sensor input by sensors of the sample devices; generating valid telemetry data by the sample device sensors based on the sensor input and/or sensor output; analyzing the valid telemetry data by the ML models; and outputting, by the ML models, sample representative models of hardware intrinsic development data based on the valid telemetry data, the sample representative models being generated and utilized for the comparisons with the test representative models.

According to various implementations, any of the example methods described herein can be performed by a processor. For example, a device or system may include the processor and memory storing instructions for performing an example method, wherein the processor executes the method. In some implementations, a non-transitory computer readable medium stores instructions for performing an example method.

EXAMPLE EMBODIMENTS

This disclosure describes techniques for detecting counterfeit products by identifying differences between hardware components and orientations of the counterfeit products, and hardware components and orientations of authentic products. In some cases, the hardware components and orientations can be identified by generating hardware intrinsic development data based on telemetry data of products (or "devices"). By way of example, the telemetry data may be analyzed by machine learning (ML) models to generate representative models of the hardware intrinsic development data. In various examples, the representative models can include sample representative models of hardware intrinsic development data generated based on valid telemetry data of authentic devices. In those or other examples, the representative models can include other representative models (or "test representative models") of hardware intrinsic development data generated based on unvalidated telemetry data of test devices.

In some implementations, the ML models can be utilized to generate, dynamically or otherwise, the representative models based on analysis by the ML models of the telemetry data. For instance, the representative models can include graphs, such as scatter plots, any other types of graphs and/or plots, or any combination thereof. The ML models, for example, can include uniform manifold approximation and projection (UMAP) models, t-distributed stochastic neighbor embedding (t-SNE) models, rank metrics models, auto-encoding models, principal component analysis (PCA) models, one or more of any other types of ML model, or any combination thereof. In various cases, the telemetry data, such as the valid telemetry data and the unvalidated telemetry data, can be generated based on sensor data of various types. For example, the sensor data can be aggregated and formed as the telemetry data. In some examples, the sensor data can be generated by various types of sensors of the devices. In those or other examples, the sensors can generate the sensor data based on various types of sensor input to the sensors, such as during run-time of the devices.

In various examples, output of the ML models can be utilized to detect whether the test devices are counterfeit device based on comparisons (e.g., automated comparisons, such as computer software driven comparisons) (e.g., manual/human, visual comparisons) between the representative models. For example, results of the comparisons can be determined based on characteristics of the representative models. In some cases, the characteristics can include patterns, distributions, shapes, sizes, densities, correlations, covariances, and the like, or any combination thereof. In various implementations, the test devices can be detected as being counterfeit based on differences between characteristics of the test representative models and characteristics of the sample representative models being greater than or equal to threshold differences. In some cases, the comparisons can be performed by utilizing the ML models to input the representative models and output the results of the comparisons.

In some examples, comparisons can be performed by computing systems, additionally or alternatively, to human manual checks (e.g., instead of human manual checks, or to determine if human manual checks are accurate, etc.). In those or other examples, the computing systems (e.g., computing systems in edge servers, cloud computing systems, personal computers, etc., or any combination thereof) can be utilized to automatically flag results of the comparisons without human intervention. The flagged results can be used to automatically perform actions (e.g., display information on user devices) (e.g., transmit messages to the user devices) (e.g., control flags, profiles, activations, operations, authorizations associated with the tested devices, etc.).

In various implementations, the representative models and/or the comparison results may enable computing devices to take one or more actions about the results of the telemetry data analysis performed by the ML models. For instance, the representative models and/or the comparison results can be provided to personal area network (PAN) routers associated with the sending device, wide area network (WAN) routers, network switches, and so forth. In some examples, the distributed devices that are provided with the representative models and/or the comparison results can then manage authorization, activation, and/or operation of the test devices. In those or other examples, the distributed devices that are provided with the representative models and/or the comparison results can cause presentation, by displays, of alert notifications indicating mismatches between the test devices and the genuine devices. In those or other examples, the distributed devices that are provided with the representative models and/or the comparison results can manage profiles associated with the test devices, such as by triggering flags associated with the test devices to identify the test devices as being counterfeit. Conversely, if the distributed devices identify, from the representative models and/or the comparison results, that a test device is not counterfeit, authorization, activation, and/or operation of the test devices can be managed accordingly, notifications can be presented that the test devices are not counterfeit, and/or flags can be left untriggered.

Generally, the techniques of this application improve the performance of various types of computing devices by reducing the amount of compute, network, and/or storage resources required to operate the computing devices. Unnecessary resources that would otherwise be required for operation of counterfeit devices may be avoided by initial detection of the devices as being counterfeit. In some instances, storage resources of the counterfeit devices and/or other devices that would interact with the counterfeit devices, that would otherwise be expended for managing information associated with the counterfeit devices can be reallocated for other purposes. In various instances, compute resources of the counterfeit devices, and/or other devices that would interact with the counterfeit devices, that would otherwise be expended can be conserved by removing authorization, by deactivating, and/or by preventing operation of, the counterfeit devices. In some examples, network resources of the counterfeit devices and/or other devices that would interact with the counterfeit devices, that would otherwise be required for communicating data between the counterfeit devices and the other devices can be conserved.

Generally, the techniques of this application improve the performance of various types of networks by reducing the amount of network-based communications or traffic that would otherwise be sent over one or more networks, but is ultimately undesirable in connection with counterfeit devices. By limiting and/or preventing network communications to and/or from the counterfeit devices, network bandwidth usage can be conserved, network throughput can be increased, network latency can be improved, and packet loss occurrences can be minimized.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example topology of a computing and network architecture 100 for comparing valid telemetry data received from one or more sample devices 102, with unvalidated telemetry data received from one or more user devices 104, for anti-counterfeit device management. In some examples, the sample device(s) 102 and/or the user device(s) 104 can be connected to, and/or be in communication with, one or more supplier devices 106 of a supplier. In those or other examples, the sample device(s) 102 and/or the user device(s) 104 can be connected to, and/or be in communication with, an anti-counterfeit device management architecture 108 that includes one or more distributed devices 110.

Generally, the anti-counterfeit device management architecture 108 may include devices housed or located in one or more data centers that may be located at different physical locations. For instance, the anti-counterfeit device management architecture 108 may be supported by networks of devices in a public cloud computing platform, a private/enterprise computing platform, and/or any combination thereof. The one or more data centers may be physical facilities or buildings located across geographic areas that designated to store networked devices that are part of the anti-counterfeit device management architecture 108. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the distributed application architecture 108 may not be located in explicitly defined data centers, but may be located in other locations or buildings.

The anti-counterfeit device management architecture 108 may be accessible to the sample device(s) 102, the user device(s) 104, and/or the supplier device(s) 106 over the network(s) 112, such as the Internet. The anti-counterfeit device management architecture 108, and the network(s) 112, may each respectively include one or more networks implemented by any viable communication technology, such as wired and/or wireless modalities and/or technologies. The anti-counterfeit device management architecture 108 and network(s) 112 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The distributed application architecture 108 may include devices, virtual resources, or other nodes that relay packets from one network segment to another by nodes in the computer network.

Individual ones of the sample device(s) 102 and/or individual ones of the user device(s) 104 can be located at a premises of the supplier (e.g., any of the devices can be local) or located remotely (e.g., externally) from the premises of the supplier (e.g., any of the devices can be remote and/or external). For example, with instances in which at least one of the sample device(s) 102 and/or at least one the user device(s) 104 are remote, individual ones of the sample device(s) 102 and/or individual ones of the user device(s) 104 being remote can be connected (e.g., wirelessly connected) by, and/or can communicate via, one or more networks 112.

The network(s) 112 can include one or more communication networks configured to transfer data between devices, such as the sample device(s) 102 and/or the user device(s) 104. The network(s) 112 may include one or more wireless networks, one or more wired networks, or a combination thereof. Examples of wireless networks include Near Field Communication (NFC) networks; Institute of Electrical and Electronics (IEEE) networks, such as WI-FI networks, BLUETOOTH networks, and ZIGBEE networks; Citizens Broadband Radio Service (CBRS) networks; 3rd Generation Partnership Program (3GPP) networks, such as 3rd Generation (3G), 4th Generation (4G), and 5th Generation (5G) Radio Access Networks (RANs); or any combination thereof. Examples of wired networks include networks connected via electrical and/or optical cables. In some cases, the network(s) 112 include at least one core network, such as an IP Multimedia Subsystem (IMS) network, an Evolved Packet Core (EPC), a 5G Core (5GC), or any combination thereof. In some implementations, the network(s) 112 include one or more Wide Area Networks (WANs), such as the Internet.

The network(s) 112 can include one or more network devices. The network device(s) can include one or more devices that are connected to each other via one or more wireless and/or wired interfaces. Examples of the network device(s) include routers, network switches, access points (APs), base stations, and the like. The network device(s) can include one or more network nodes.

Products can be authenticated by using genuine products. Products can be identified as being genuine based on verification of the genuine products as being manufactured, distributed, etc., according to instructions, schematics, etc., without any modification or replacement of the products and/or any portions of the products. In some examples, individual ones of the sample device(s) 102 can be a genuine product (or "genuine device") (or "authentic device") (e.g., a supplier device, a distributor device, a manufacturer device, etc., or any combination thereof). In those or other examples, individual ones of the user device(s) 104 can be a test product (or "test device") (e.g., a vendor device, a customer device, etc., or any combination thereof).

The sample device(s) 102 can be utilized to generate telemetry data (e.g., data known to be valid) (e.g., a combination of sensor data from one or more of the sensor(s) of the sample device(s) 102) utilized to prevent counterfeiting. In some examples, the telemetry data generated by the sample device(s) 102 can include valid telemetry data 114 generated by at least one of the sample device(s) 102 based on the at least one of the sample device(s) 102 being local. In those or other examples, the telemetry data generated by the sample device(s) 102 can include valid telemetry data 116 generated by at least one of the sample device(s) 102 based on the at least one of the sample device(s) 102 being remote. Lines associated with the valid telemetry data 116 are illustrated in FIG. 1 as dashed lines, based on transmission of the valid telemetry data 116 being able to be implemented as an alternative to transmission of the valid telemetry data 114 (e.g., the valid telemetry data 114 may be utilized as part of a standard/default (e.g., relatively more common) implementation that is more frequently used than an implementation utilizing the valid telemetry data 116, based on the sample device(s) 102 being more frequently and/or preferably/desirably positioned locally at the supplier premises rather than remotely, for purposes of increased security, convenience, reliability, feasibility, simplicity, etc.).

The valid telemetry data 114/116 can be generated by the sample device(s) 102 based on the sample device(s) 102 being authentic devices utilized to authenticate test devices (e.g., the user device(s) 104). In some examples, the valid telemetry data 114/116 can be generated based on sensor input received by one or more sensors of the sample device(s) 102, and/or based on sensor output of the sensor(s). The sensor(s) can utilize the sensor input to generate sensor output (e.g., sensor data). The valid telemetry data 114/116 can be generated based on the sensor data, the valid telemetry data 114/116 being generated by forming and/or amalgamating the sensor data as the valid telemetry data 114/116.

In some examples, the sensor data can be scaled and formed as the valid telemetry data 114/116. In those examples, the valid telemetry data 114/116 being utilized based on input data (e.g., the sensor output) (e.g., the sensor data) being scaled, enables results achieved by analysis of the valid telemetry data 114/116 (by the ML model(s), as discussed below in further detail) to be more intuitive, easier to understand, and simpler to comprehend based on a simple glance.

In various implementations, capturing of the valid telemetry data 114/116, and/or controlling of the capturing of the capturing of the valid telemetry data 114/116, can be performed by one or more telemetry data management devices. For example, the telemetry data management device(s) can include the sample device(s) 102, the supplier device(s) 106, the distributed device(s) 110, one or more other local or remote devices, and/or any combination thereof.

The sample device(s) 102 can include various types of sensor(s). The sensor(s) can include at least one of one or more voltage sensors detecting voltage input/output from one or more electrical devices (e.g., one or more electrical devices soldered on a printed circuit board (PCB)) in the sample device(s) 102, one or more current sensors detecting current input/output from one or more electrical devices (e.g., one or more electrical devices soldered on the PCB), one or more temperature sensors detecting temperature output from one or more electrical devices (e.g., one or more electrical devices soldered on the PCB), one or more fan speed sensors detecting fan speed output from one or more electrical devices (e.g., one or more electrical devices soldered on the PCB) (e.g., one or more fans or various types), one or more power sensors detecting power input/output from one or more electrical devices (e.g., one or more electrical devices soldered on the PCB), and so on, or any combination thereof.

The sample device(s) 102 can include one or more electrical devices (e.g., hardware components (also referred to herein simply as "component(s))) (e.g., one or more sub-devices (e.g., hardware sub-components (also referred to herein simply as "sub-component(s))). The electrical sub-device(s) can include one or more components (e.g., the component(s), the sub-component(s), etc.) of any type, such as one or more printed circuit boards, one or more processors, one or more storage devices, one or more network controllers, one or more input/output controllers, one or more chipsets, one or more optical components, one or more resistors, one or more capacitors, one or more inductors, one or more conductors, one or more electrical transmission lines, one or more electrical buses, and so on, or any combination thereof.

The valid telemetry data 114/116 associated with the sample device(s) 102 can be based on, representative of, etc., the sample device(s) 102. In some examples, the valid telemetry data 114/116 can be based on, representative of, etc., at least one of the device(s) (e.g., the sub-device(s)) of the sample device(s) 102. In those or other examples, the valid telemetry data 114/116 can be a complete representation of the sample device(s) 102 (e.g., the telemetry data can be representative of, all of the device(s) (e.g., the sub-device(s)) of the sample device(s) 102). The valid telemetry data 114/116 can be generated as, and/or based on, at least one of output of the voltage sensor(s), output of the current sensor(s), output of the temperature sensor(s), output of the fan speed sensor(s), or output of the power sensor(s) of the sample device(s) 102.

In various examples, individual ones (e.g., a set (or "group") of valid telemetry data) of the valid telemetry data 114/116 can include one or more portions (e.g., one or more telemetry data portions) (e.g., one or more strings) (or "segment(s)") (or "line(s)") of data. In various examples, individual ones of the portion(s) can include one or more telemetry data sub-portions (e.g., one or more data values) (or "element(s)") associated with a dimension from among one or more dimensions (e.g., N dimensions) (e.g., 5 dimensions, 10 dimensions, 20 dimensions, 50 dimensions, 100 dimensions, 1000 dimensions, etc.). In some implementations, a number of the dimension(s) associated with, and/or corresponding to, a number of data values in a line of the valid telemetry data 114/116 can be less than or equal to a number of one or more sensors of a sample device (e.g., any of the sample device(s) 102).

In some examples, individual ones of the portion(s) can be associated with, and/or can correspond to, a point in time at which capturing of a portion (e.g., sensor input captured by individual ones of one or more of the sensor(s) of the sample device 102) of the valid telemetry data 114 occurred. Data (e.g., temporal data included in, included as part of, and/or tracked along with, the valid telemetry data) including one or more points in time (e.g., the point in time at which capturing of the portion of the valid telemetry data 114 occurred) can include, for example, a date (e.g., year, month, day), a time (e.g., hours, minutes, seconds), and so on, or any combination thereof, can be captured by the telemetry data management device.

The valid telemetry data 114/116 associated with the sample device(s) 102 can be generated by, and, in some cases, stored by, the sample device(s) 102. In some examples, the sample device(s) 102 and/or one or more devices communicatively coupled to the sample device(s) 102, can generate the valid telemetry data 114/116 by executing one or more software programs (e.g., launching one or more executable files, one or more applications, etc.). The software can include software instructions utilized to capture the sensor input, generate the sensor output (e.g., the sensor data), and generate the valid telemetry data 114/116.

In various examples, attributes telemetry collection (e.g., collection of the telemetry data 114/116) can be performed using one or more software programs of any type (e.g., the attributes telemetry collection does not require a particular type of software program). One or more of various types of protocols associated with network hardware can enable/allow the attributes telemetry collection. In some cases, the attributes telemetry collection can be performed simply through one or more hardware operating instruction subscription pushes out, or through one or more external receivers (e.g., via one or more software commands) to pull out telemetry data (e.g., the valid telemetry data 114/116).

The user device(s) 104 can be utilized to generate telemetry data. In some cases, the user device(s) 104 can be utilized to generate unvalidated telemetry data, such as unvalidated telemetry data 118 (e.g., telemetry data not known to be valid or invalid). For example, any of the unvalidated telemetry data (e.g., the unvalidated telemetry data 118) can be generated by any of the user device(s) 104 in a similar way as for any of the valid telemetry data 114/116 generated by the sample device(s) 102.

By way of example, the user device(s) 104 can include various types of sensor(s). The sensor(s) can include at least one of one or more voltage sensors detecting voltage input/output from one or more electrical devices (e.g., one or more electrical devices soldered on a printed circuit board (PCB)) in the user device(s) 104, one or more current sensors detecting current input/output from one or more electrical devices (e.g., one or more electrical devices soldered on the PCB), one or more temperature sensors detecting temperature output from one or more electrical devices (e.g., one or more electrical devices soldered on the PCB), one or more fan speed sensors detecting fan speed output from one or more electrical devices (e.g., one or more electrical devices soldered on the PCB) (e.g., one or more fans of various types), one or more power sensors detecting power input/output from one or more electrical devices (e.g., one or more electrical devices soldered on the PCB), and so on, or any combination thereof.

The unvalidated telemetry data 118 can be generated as, and/or based on, at least one of output of the voltage sensor(s), output of the current sensor(s), output of the temperature sensor(s), output of the fan speed sensor(s), or output of the power sensor(s) of the user device(s) 104. The unvalidated telemetry data 118 can be used as input data for the ML model(s) to determine whether the user device(s) 104 are counterfeit.

The user device(s) 104 can be structurally, electrically, and/or functionally equivalent to, or different from, the sample device(s) 102. For example, at least one of the user device(s) 104 can be genuine, with an equivalent hardware formation (e.g., construction) as the sample device(s) 102; and/or, at least one of the user device(s) 104 can be counterfeit, with a different (e.g., non-equivalent) hardware formation from the sample device(s) 102. In some examples, the user device(s) 104 can include any of the device(s) (e.g., the sub-device(s)) of the sample device(s) 102, and/or include one or more additional device(s) (e.g., sub-device(s)). In those or other examples, the user device(s) 104 can be missing, and/or include modified versions of, one or more of the device(s) (e.g., the sub-device(s)) of the sample device(s) 102. Modified versions of the device(s) can include any type of modified versions, such as one or more hardware modifications (e.g., one or more hardware components being different), one or more software modifications (e.g., one or more software components being different), one or more firmware modifications (e.g., one or more firmware components being different), and so on, or any combination thereof.

The sample device(s) 102 can transmit the telemetry data, which can be utilized for counterfeit detection. In some examples, the sample device(s) 102 can transmit the telemetry data to the supplier device(s) 106, such as by transmitting the valid telemetry data 114 to the supplier device(s) 106 (e.g., the valid telemetry data 114 can be transmitted directly to the supplier device(s) 106, and/or indirectly via at least one network (e.g., at least one of the network(s) 112)). In those or other examples, the sample device(s) 102 can transmit the telemetry data to the supplier device(s) 106, such as by transmitting the valid telemetry data 116, via the network(s) 112, to the distributed device(s) 110. In some cases, for instance with the telemetry data (e.g., the valid telemetry data 114 and/or other valid telemetry data) being transmitted to, and/or generated by, the supplier device(s) 106, the supplier device(s) 106 can analyze the telemetry data (e.g., the valid telemetry data 114) and/or route the telemetry data (e.g., the valid telemetry data 114), via the network(s) 112, to the distributed device(s) 110 (e.g., the valid telemetry data 114 can be routed as part of telemetry data and/or analysis results data 120, as discussed below, in further detail).

In some examples, one or more of various protocols can be used to transmit the telemetry data. The protocol(s) can include at least one protocol associated with network hardware (e.g., one or more network hardware devices) associated with one or more vendors (e.g., one or more different vendors) and/or with one or more brands (e.g., one or more devices of one or more brands that are compliant and/or compatible with one or more protocols). The protocols (e.g., netconf, gNMI, gRPC, etc.) can be utilized to transmit, and/or to allow transmission of, the telemetry attributes. Allowing transmission of the telemetry data (e.g., the valid telemetry data 114/116 can include performing one or more security functions, which can be managed by the supplier(s), one or more owners (e.g., one or more customers) of the hardware, etc. For example, allowing transmission of the telemetry data can include utilizing one or more permission keys authorized by the customer(s), through one or more IOS subscriptions by the customer(s) (e.g., the permission key(s) can be received and verified by the supplier device(s) 106.

The user device(s) 104 can transmit telemetry data in a similar way as, or a different way from, the telemetry data (e.g., the valid telemetry data 114/116) being transmitted by the sample device(s) 102. In some examples, the user device(s) 104 can transmit the unvalidated telemetry data 118 in a similar way as, or a different way from, the valid telemetry data 116 being transmitted by the sample device(s) 102. In those or other examples, the user device(s) 104 can transmit unvalidated telemetry data (e.g., the unvalidated telemetry data 118 and/or other unvalidated telemetry data) as part of telemetry data and/or analysis results data 122, in a similar way as, or a different way from, the valid telemetry data 114 being transmitted as part of the telemetry data and/or analysis results data 120. In some examples, the telemetry data and/or analysis results data 122 can be transmitted to one or more devices (e.g., the supplier device(s), the distributed device(s) 110, one or more other devices, and so on, or any combination thereof), based on unvalidated telemetry data being generated by one or more remote user devices (e.g., one or more of the user device(s) 104 being located remotely from the supplier, such as being located at a location of a vendor).

Telemetry data can be generated by the user device(s) 104, based on the user device(s) 104 being at one or more locations of various types. In some examples, the user device(s) 104 can transmit unvalidated telemetry data (e.g., the unvalidated telemetry data 118 and/or other unvalidated telemetry data) as part of telemetry data and/or analysis results data 124. In those or other examples, the telemetry data and/or analysis results data 124 can be transmitted to one or more devices (e.g., the supplier device(s), the distributed device(s) 110, one or more other devices, and so on, or any combination thereof), based on unvalidated telemetry data being generated by one or more remote user devices (e.g., one or more of the user device(s) 104 being located locally at the supplier, such as being located at the location of the supplier). Lines associated with the telemetry data and/or analysis results data 124 are illustrated in FIG. 1 as dotted lines, based on transmission of the telemetry data and/or analysis results data 124 being able to be implemented as an alternative to transmission of the telemetry data and/or analysis results data 122 (e.g., the telemetry data and/or analysis results data 122 may be utilized as a standard/default (e.g., relatively more common) implementation that is more frequently used than an implementation utilizing the telemetry data and/or analysis results data 124, based on the sample device(s) 104 being more frequently and/or preferably/desirably positioned remotely at the user premises.

Telemetry data of one or more of various types can be communicated between one or more devices of various types and the distributed device(s) 110. In various examples, the telemetry data of one or more of the various types can be communicated with the distributed device(s) 110, in anti-counterfeit device management data 126 and as valid and/or unvalidated telemetry data 128, the valid and/or unvalidated telemetry data 128 including one or more of any type of telemetry data, such as the valid telemetry data 114, the valid telemetry data 116, the unvalidated telemetry data 118, the telemetry data in the telemetry data and/or analysis results data 122, the telemetry data in the telemetry data and/or analysis results data 122, any other valid and/or unvalidated telemetry data, and so on, or any combination thereof. The valid and/or unvalidated telemetry data 128 can be included in the anti-counterfeit device management data 126, along with analysis results data, as discussed in further detail below, being included as analysis results data 130, in the anti-counterfeit device management data 126.

One or more devices (e.g., the supplier device(s) 106, the distributed device(s) 110, etc., or any combination thereof) can be utilized to analyze the telemetry data, including valid telemetry data (e.g., the valid telemetry data 114/116, any other valid telemetry data, etc., or any combination thereof), unvalidated telemetry data (e.g., the unvalidated telemetry data 118, any other unvalidated telemetry data 118, etc., or any combination thereof), any other telemetry data, or any combination thereof. By way of example, the distributed device(s) 110 can analyze the valid telemetry data 114.

One or more devices (e.g., the supplier device(s) 106, the distributed device(s) 110, etc., or any combination thereof) can include one or more machine learned (ML) models, which can be utilized to analyze the valid telemetry data 114. The ML models can include one or more uniform manifold approximation and projection (UMAP) models, one or more t-distributed stochastic neighbor embedding (t-SNE) models, one or more rank metrics models, one or more auto-encoding models, one or more principal component analysis (PCA) models, one or more of any other types of ML model, or any combination thereof.

The ML model(s) can receive the valid telemetry data 114, and output data based on analysis of the valid telemetry data 114. Data output by the ML model(s) can include hardware intrinsic development data, and/or one or more sample representative models of the hardware intrinsic development data. In some cases, the sample representative models output by the ML model(s) can be utilized for the comparisons with output of the ML model(s) based on unvalidated telemetry data analysis by the ML model(s). The valid telemetry data 114 and/or the unvalidated telemetry data 114 can be used as input data for the ML model(s) to determine whether the user device(s) 104 are counterfeit.

The data (e.g., the hardware intrinsic development data) output (e.g., the sample representative models) by the ML model(s) can be generated by the ML model(s) as one or more graphs of various types. The data (e.g., the graph(s)) output by the ML model(s) can include one or more plots (e.g., one or more scatter plots), one or more graphs (e.g., one or more bar graphs, one or more line graphs, etc.), one or more tables, one or more strings (e.g., one or more text strings), and so on, or a combination thereof. In some examples, for instance with a sample representative model being output by an ML model as a scatter plot, a horizontal axis (e.g., an x-axis) can include representative x-axis units generated by the ML model; and a vertical axis (e.g., an x-axis) can include representative y-axis units generated by the ML model.

The data (e.g., the hardware intrinsic development data) output by the ML model(s) can include one or more portions (e.g., one or more graph portions) (e.g., one or more scatter plot portions) (e.g., one or more data points) (or "value(s)") of data. For example, individual ones of the scatter plot points can be associated with one or more of the dimensions (e.g., one or more of the N dimensions) of a telemetry data portion (e.g., a segment of the telemetry data associated with a point in time). In some instances, individual ones of the scatter plot points can be associated with all of the N dimensions of the telemetry data segment, based on N-dimensional data of the telemetry data segment being converted to two-dimensional (2D) data or three-dimensional (3D) data of a representative model (e.g., a scatter plot) of hardware intrinsic development data. By way of example, an N-dimensional segment of telemetry data (e.g., data from each of the sample device sensors) associated with a point in time can be represented in a 2D scatter plot as a 2D point or in a 3D scatter plot as a 3D point, etc.

The data (e.g., the hardware intrinsic development data) (e.g., the representative models of the hardware intrinsic development data) can be generated based on the ML model(s) analyzing the telemetry data for significance of various portions of the telemetry data. In some examples, one or more weights can be assigned by the ML model(s) to a portion of the telemetry data, based on the portion of the telemetry data being determined by the ML model(s) to correspond to a significance associated with determining whether the unvalidated telemetry data is associated with a counterfeit device. For example, a weight can be assigned to have a relatively higher value for a portion of the telemetry data (e.g., a sensor data value of a particular type generated by a sensor of a particular type) based on the particular type of sensor data being determined by the ML model(s) to correspond to a relatively greater significance for determining whether the unvalidated telemetry data is associated with the counterfeit device.

Individual ones of one or more portions of the analysis results data, such as an analysis results data value, can be determined based on corresponding significance(s) of portion(s) of the telemetry data used to determine the analysis results data value. In some instances, a value (e.g., a value of a scatter plot point) included in the analysis results data can be determined based on the corresponding significance(s) of the portion(s) of the telemetry data utilized to determine the value (e.g., the value of the scatter plot point). By way of example, an amount of an impact (e.g., an amount of an impact of a current sensor value in the telemetry data) on the value of the analysis results data may be determined to be greater than an amount of an impact (e.g., an amount of an impact of a power sensor value in the telemetry data), based on the ML model(s) determining that the value of the current sensor corresponds to a relatively greater level of significance for identifying whether the test device is counterfeit, than for the power sensor value. In various instances, a difference between a test analysis results data value and a sample analysis results data value can be relatively greater based on a relatively greater difference between a current sensor value of a test device and a current sensor value of a sample device used to determine each of the analysis results data values, notwithstanding a relatively smaller difference between a power sensor value of the test device and a power sensor value of the sample device used to determine each of the analysis results data values, based on the ML model(s) determining that the current sensor values are more indicative of the device being counterfeit than the power sensor values.

Data output by the ML model(s) can be managed as analysis results data. In some examples, the ML model(s), which can be managed by one or more devices (e.g., the sample device(s) 102, the distributed device(s) 110, the supplier device(s) 106, and so on, or any combination thereof), can output data (e.g., the representative model(s) (e.g., the scatter plot(s)) of hardware intrinsic development data) as the analysis results data (e.g., sample analysis results data). In some examples, the sample analysis results data can be utilized for counterfeit protection, based on the sample analysis results data being associated with genuine devices (e.g., at least one of the sample device(s) 102).

The analysis results data can be utilized and/or stored by one or more devices of various types. In various implementations, one or more devices (e.g., the distributed device(s) 110, the supplier device(s) 106, and/or one or more other devices, or any combination thereof), can analyze, via the ML model(s), the telemetry data and output the analysis results data.

The analysis results data can be communicated between one or more devices of various types. In some examples, the analysis results data being generated by the distributed device(s) 110 can be stored in the distributed device(s) 110, and/or transmitted to the supplier device(s) 106, via the network(s) 112, the supplier device(s) 106 storing the analysis results data received from the distributed device(s) 110. In those or other examples, the analysis results data being generated by the supplier device(s) 106 can be stored in the supplier device(s) 106, and/or transmitted to the distributed device(s) 110, via the network(s) 112, the distributed device(s) 110 storing the analysis results data received from the distributed device(s) 110. The analysis results data being exchanged being one or more devices (e.g., between the distributed device(s) and the supplier device(s) 106) can be communicated as part of the telemetry data and/or analysis results data 120.

In various examples, one or more protocols can be used for analysis results data transmission, such as one or more protocols (e.g., one or more protocols that are the same as, or different from, the protocols for transmission of the telemetry data) associated with the customer(s). One or more data transmission permissions associated with the analysis results data can be managed by the supplier(s), the owner(s)/customer(s) of the hardware of the user device (s), the other computing device(s) communicatively coupled to the user device(s), etc.

The telemetry data generated by the user device(s) 104 can be analyzed using the ML model(s) in a similar way as for the telemetry data generated by the supplier device(s) 106. In various examples, unvalidated telemetry data (e.g., the unvalidated telemetry data 118) can be analyzed by one or more devices (e.g., the distributed device(s) 110, the supplier device(s) 106, and/or one or more other devices, or any combination thereof), by the unvalidated telemetry data (e.g., the unvalidated telemetry data 118) being input into the ML model(s). The ML model(s) can generate analysis results data (e.g., test analysis results data) based on analysis by the ML model(s) of the unvalidated telemetry data (e.g., the unvalidated telemetry data 118).

Analysis results data of can be transmitted by the user device(s) 104, without any telemetry data. In various examples, the analysis results data can be transmitted by the user device(s) 104, as analysis results data 132, without any telemetry data. For example, the analysis results data 132 can be transmitted without any telemetry data, based on the analysis result data 132 being generated using the telemetry data (e.g., the unvalidated telemetry data 118, other unvalidated telemetry data, or any combination thereof) of the user device(s) 104.

Analysis results data of one or more of various types can be communicated between one or more devices of various types and the distributed device(s) 110. In various examples, the analysis results data of one or more of the various types can be communicated with the distributed device(s) 110, in the anti-counterfeit device management data 126 and as the analysis results data 130, the analysis results data 130 including one or more of any type of analysis results data, such as the analysis results data in the telemetry data and/or analysis results data 120, the analysis results data in the telemetry data and/or analysis results data 122, the analysis results data in the telemetry data and/or analysis results data 124, the analysis results data 132, and so on, or any combination thereof. In some examples, the telemetry data and/or analysis results data 120 can include one or more portions of the anti-counterfeit device management data 126, and/or vice versa.

One or more comparisons between one or more different batches of analysis results data can be utilized for counterfeit protection. In some examples, at least one of the analysis results data batches (e.g., the analysis results data based on the valid telemetry data 114) can be compared with at least one other of the analysis results data batches (e.g., the analysis results data based on the unvalidated telemetry data 118). In some examples, the analysis results data comparisons can be performed based on whether or not individual portions of the analysis results data being compared are organized into, and/or part of, a representative model. For instance, with examples in which a comparison is performed between the analysis results data (e.g., the sample analysis results data) based on the valid telemetry data 114, and the analysis results data (e.g., the test analysis results) based on the unvalidated telemetry data 118, a result of the comparison can be utilized to identify whether the test analysis results match the sample analysis results.

Identifying whether the test analysis results match the sample analysis results can be utilized to detect whether at least one user device is counterfeit. In various examples, identifying that the test analysis results do not match the sample analysis results can be utilized to detect that at least one user device (e.g., at least one of the user device(s) 104) is counterfeit. On the contrary, identifying that the test analysis results match the sample analysis results can be utilized to detect that the at least one user device (e.g., the at least one of the user device(s) 104) is not counterfeit.

Identifying that the test analysis results match the sample analysis results can include identifying that the test analysis results substantially match the sample analysis results. For example, identifying that the test analysis results match the sample analysis results can include identifying a substantial similarity between the test analysis results and the sample analysis results. The test analysis results substantially matching the sample analysis results (e.g., the substantial similarity being identified between the test analysis results and the sample analysis results) can include determining a likelihood of a match between the test analysis results and the sample analysis results, and determining the likelihood is greater than or equal to a threshold likelihood. In some examples, the likelihood can be determined by utilizing the ML model(s) to analyze the test analysis results (e.g., the characteristics(s) of the test analysis results) and the sample analysis results (e.g., the characteristics(s) of the sample analysis results).

In some examples, the supplier device(s) 106, the distributed device(s) 110, one or more other devices, etc., can provide one or more details for specific experts (e.g., the supplier(s)) based on the analysis results. However, analysis by non-experts, such as non-engineering employees, customers, etc., can be easily performed based on the analysis results to obtain insights, to draw conclusions, and/or to understand the test results, outcomes of the tests, and/or action(s) performed based on the test results. For example, a simple outcome may include an action of causing presentation by the supplier device(s) 106, the user device(s) 104 and/or the computing device(s) to which the user device(s) 104 are connected, etc., of a phrase such as "please check this hardware, it may not be supplier hardware" (e.g., the phrase can be output based on the test analysis results (e.g., the characteristics(s) of the test analysis results) not matching (e.g., being similar to, and/or conforming to, resembling, etc.) the sample analysis results) with a matching level (e.g., a similarity level, a conformance level, a resemblance level, etc.) that is greater than or equal to a threshold level (e.g., a threshold matching level, etc.).

Individual ones of one or more results of the comparison(s) being determined (e.g., output by the ML model(s)) as a mismatch can be used to determine the test analysis results are associated with a counterfeit device (e.g., one of the user device(s) 104 that is counterfeit). For example, the mismatch can be determined based on the likelihood of the match being less than the threshold likelihood. In some examples, the likelihood of the match can be determined a percentage (e.g., a 20%, 50%, 75%, 100%, etc., chance that the device is counterfeit). In various examples, the percentage likelihood of the match can be determined based on identifying a percentage value of each of the characteristic(s) of a test analysis result that matches a corresponding characteristic of a sample analysis result. For example, a percentage value corresponding to an amount that a shape formed by the 2D-scatter plot for the test analysis results matches a shape formed by the 2D-scatter plot for the sample analysis results can be determined as part of the comparison. One or more of the characteristics-based percentage values can be computed and utilized (e.g., utilized by the ML model(s)) to identify the likelihood of the match.

Confidence values can be identified for results of the comparisons between the characteristic(s) of the hardware intrinsic development data (e.g., the 2D-scatter plot) for the test analysis results and the characteristic(s) of the hardware intrinsic development data (e.g., the 2D-scatter plot) for the sample analysis results. The confidence values can be utilized as part of the determination of the likelihood of the match. For example, a confidence value associated with the percentage value corresponding to the amount that the shape formed by the 2D-scatter plot for the test analysis results matches the shape formed by the 2D-scatter plot for the sample analysis results can be determined and utilized as part of the determination of the likelihood of the match. Each of the confidence values being greater than or equal a corresponding threshold confidence value can be utilized to incorporate the relative percentage value into the determination of the likelihood of the match. On the contrary, each of the confidence values being less than the corresponding threshold confidence value can be utilized to ignore (e.g., omit) the relative percentage value for the determination of the likelihood of the match.

One or more comparisons (e.g., one or more automated comparisons) between the telemetry data of one or more of various types can be automatically performed and utilized for counterfeit protection. In some examples, one or more automated comparisons can be performed dynamically, during run-time of one or more devises (e.g., the sample device(s) 102, the user device(s) 104, one or more other devices, or any combination thereof), based on results data being automatically generated using the telemetry data of the device(s). Dynamically performing the automated comparison(s) can include performance of the automated comparison(s) being triggered by output of the automatically generated results data from at least one of the devises(s). The automated comparison(s) being triggered by output of the automatically generated results data from at least one of the devises(s) can include triggering analysis, by the ML model(s), of one or more of the telemetry data to be used for the automated comparison(s), and triggering of the automated comparison(s) based on output of the analysis results data to be used for the automated comparison(s).

The comparison(s) (e.g., the automated and/or dynamic comparison(s)) can be performed utilizing various types of comparison type data utilized for comparisons of the analysis results data. In various implementations, the comparison type data can include one or more patterns, one or more distributions, one or more shapes, one or more sizes, one or more densities, one or more correlations, one or more covariances, and the like, or any combination thereof. In some examples, the user device(s) 104 can be detected as being counterfeit based on differences identified based on the comparison type data, such as one or more characteristics (e.g., one or more test characteristics) of the test representative models of the user device(s) 104 being different from one or more characteristics (e.g., one or more sample characteristics) of the sample representative models of the sample device(s) 102. In those or other examples, the user device(s) 104 can be detected as being counterfeit based on the difference(s) of the test characteristic(s) (e.g., the pattern(s), the distribution(s), the shape(s), the size(s), the density(ies), the correlation(s), the covariance(s), and the like, or any combination thereof) and the corresponding sample characteristic(s) (e.g., the pattern(s), the distribution(s), the shape(s), the size(s), the density(ies), the correlation(s), the covariance(s), and the like, or any combination thereof) being greater than or equal to the threshold difference(s).

Triggering of automated analysis (e.g., automated analysis of any of the telemetry data based on software instructions being executed by devices storing the telemetry data) and/or automated comparisons (e.g., automated comparisons using analysis results data based on software instructions being executed by devices performing the comparisons) can be performed based on one or more anti-counterfeit commands (e.g., one or more anti-counterfeit commands being processed by the device(s)) and/or one or more triggering communications (e.g., one or more triggering communications exchanged between one or more devices). In some examples, the triggering communications can be exchanged between the device(s) (e.g., one or more devices (e.g., the distributed device(s) 110, the supplier device(s) 106, and/or one or more other devices, or any combination thereof)).

The anti-counterfeit command(s) and/or the triggering communication(s) can be processed to trigger telemetry data analysis (e.g., triggering analysis by the ML model(s), of the telemetry data), to trigger performance of one or more comparisons (e.g., triggering one or more comparisons between the analysis results data), to trigger one or more actions to be performed based on one or more results of the comparison(s), and so on, or any combination thereof. The triggering communication(s) can be transmitted based on one or more commands (e.g., one or more triggering communication commands, included as one or more of the anti-counterfeit command(s)).

In some examples, the anti-counterfeit command(s) can be generated by one or more devices (e.g., the distributed device(s) 110, the supplier device(s) 106, and/or one or more other devices, or any combination thereof)) based on one or more user selections (e.g., one or more user selections received via user input to one or more user interfaces). In those or other examples, the anti-counterfeit command(s) can be generated by the device(s) (e.g., the distributed device(s) 110, the supplier device(s) 106, and/or one or more other devices, or any combination thereof)) based on stored scheduling data (e.g., data scheduling the comparison command(s) and/or the triggering communication(s)) (e.g., periodically, after a period of time from a previous comparison command and/or triggering communication, etc.). In those or other examples, the anti-counterfeit command(s) can be generated based on one or more notifications received from one or more devices (e.g., the user device(s) 104, the sample device(s) 102), and/or one or more computing devices to which they are communicatively coupled, the notification(s) being triggered by, and/or indicating occurrences of, one or more modifications to the device(s).

At least one of the anti-counterfeit command(s) can be generated based on results generated by performance triggered by at least one previous command of the anti-counterfeit command(s). For examples, an anti-counterfeit command to perform a comparison of the analysis results data associated with the valid telemetry data 114 and the analysis results data associated with the unvalidated telemetry data 118 can be generated based on generation of the valid telemetry data 114 being completed, based on generation of the unvalidated telemetry data 118 being completed, or a combination thereof.

The anti-counterfeit command can be generated based on notifications being received by the supplier device(s) 106 and/or the distributed device(s) 110, for example, the notifications indicating the generation of the valid telemetry data 114 being completed (e.g., completed by the sample device(s) 102, as indicated by notifications transmitted by devices controlling generation of the valid telemetry data 114), and the generation of the unvalidated telemetry data 118 being completed (e.g., completed by the user device(s) 104, as indicated by notifications transmitted by devices controlling generation of the unvalidated telemetry data 118). However, in some examples, the valid telemetry data 114, and/or sample analysis results data associated with the valid telemetry data 114, can be generated (e.g., automatically generated) far in advance of, or any time of time prior to, generation of the unvalidated telemetry data 118, and/or test analysis results data associated with the unvalidated telemetry data 118, based on the valid telemetry data 114 and/or the sample analysis results data being generated for subsequent use for telemetry data analysis and/or analysis results data comparisons, as necessary.

The generation of the valid telemetry data 114, and/or the sample analysis results data associated with the valid telemetry data 114, and/or one or more anti-counterfeit commands, such as an anti-counterfeit command associated therewith, can be based on various types of data. In some examples, the data, and/or the anti-counterfeit command, used to trigger the generation of the valid telemetry data 114, and/or the sample analysis results data associated with the valid telemetry data 114, can include data identifying a new device (e.g., a new sample device), a modification to a device, and so on, or any combination thereof.

Data, and/or the anti-counterfeit command(s), can be used to trigger the generation of the valid telemetry data 114, to trigger the generation of the sample analysis results data associated with the valid telemetry data 114, to trigger performance of the comparison(s), to trigger performance of the action(s) based on the comparison result(s), and so on, or any combination thereof. The triggering using the data, and/or the anti-counterfeit command(s), can be initiated and/or performed by adding an identifier of the new device to a database (e.g., a database managed by the supplier device(s) 106, the distributed device(s) 110, etc.), generating and/or setting a flag (e.g., setting a flag in, and/or adding a flag to, a device profile of the device (e.g., the test device and/or the sample device associated with the comparison)), generating an alert (e.g., generating an alert, and/or adding an alert indicator to a device profile of the device (e.g., the test device and/or the sample device associated with the comparison)), adding data and/or data values to a profile (e.g., the profile in the database), and so on, or any combination thereof. The triggering using the data, and/or the anti-counterfeit command(s), can be performed based an addition of a new device, a device modification device, etc., a removal of a device, or any combination thereof.

In some examples, at least one of the anti-counterfeit command(s) can be utilized to trigger at least one other of the anti-counterfeit command(s). For example, the flag can be triggered by the distributed device(s) 110 to cause presentation, by a display of the supplier device(s) 106, of a notification, the flag can be triggered to cause the distributed device(s) 110 to transmit a notification to the supplier device(s) 106, and so on, or any combination thereof.

The triggering can be performed, the anti-counterfeit command(s) can be generated, and/or the triggering communication(s) can be transmitted, based on various types of changes to devices and/or a device inventory (e.g., data in a database used to manage the device(s)), on changes to data in an entry for a device, on changes to data in a device profile, etc. or any combination thereof). For example, the anti-counterfeit command(s) being generated, and/or the triggering communication be exchanged, can be based on identifying data (e.g., based on identifying database data, profile data, etc.) indicating one or more modifications (e.g., data indicating one or more modifications to software, hardware, firmware, and the like, or any combination thereof), one or more additions, one or more removals, etc., of the user device(s) 104, the sample device(s) 102, and/or one or more other devices.

One or more actions of various types can be performed based on results of one or more comparisons (e.g., results generated via automated comparisons, and/or result data input via user interfaces based on manual/human, visual comparisons) between one or more batches of analysis results data. For example, an action can be performed based on performing a comparison between the valid telemetry data 114 and the unvalidated telemetry data 118. The action can be different based on a result of the comparison between a match or a mismatch.

In some implementations, the action(s) can include one or more automated actions, causing presentation by the supplier device(s) 106, the user device(s) 104 and/or the computing device(s) to which the user device(s) 104 are connected, of a notification with a phrase such as "check that hardware," and/or "that hardware behaves differently from the rest of the hardware," and/or "return the hardware to the vendor," etc. The action(s) can be performed based on the unvalidated telemetry data 118 being analyzed and determined to be telemetry data which produces analysis results data not matching analysis results data produced via the valid telemetry data 114.

The action(s) can include one or more types of actions associated with one or more devices being determined to be counterfeit, based on one or more comparison results being one or more mismatches. For example, an action of one or more actions being performed based on a mismatch identifying a user device 104 is counterfeit can include the distributed device(s) 110 managing authorization (e.g., refraining from granting access to a profile, etc.), activation (e.g., disabling connection of the device to a network), and/or operation (e.g., remote deactivation) of the counterfeit user device 104. In those or other examples, the distributed device(s) 110 that are provided with the representative models and/or the comparison results can cause presentation, by displays of the supplier device(s) 106, of data (e.g., alert notifications indicating mismatches between the counterfeit user device 104 and a corresponding sample device 102) (e.g., one or more thumbnails (e.g., thumbnail images) associated with, and/or including an relevant data (e.g., device images, device photos, schematics, etc.) for, the counterfeit user device 104 and/or the supplier device(s) 106). In those or other examples, the distributed device(s) 110 that are provided with, and/or that generate, the representative models and/or the comparison results can manage a profile associated with the counterfeit user device 104, such as by triggering a flag (e.g., a flag in a profile, a database, etc.) associated with the counterfeit user device 104 to identify the counterfeit user device 104 as being counterfeit.

In some examples, the action(s) based on the comparison result(s) can include the distributed device(s) 110 transmitting "warning" messages (e.g., one or more authentication response messages (or "authentication response(s)") and/or "alerts" to the supplier device(s) 102 and/or the user device(s) 104, based on the user device 104 being counterfeit. In those or other examples, the action(s) based on the comparison result(s) can include the distributed device(s) 110 transmitting "warning" messages and/or "alerts" to devices of organizations affiliated with the supplier device(s) 102 and/or the user device(s) 104. By way of example, the distributed device(s) 110 can cause presentation, via display(s) of any of the device(s), of one or more "warning" and/or "alert" notifications.

The message(s) and/or notification(s) can include information associated with the counterfeit device and/or the party associated with the counterfeit device. The information in the message(s) and/or notification(s) can include an identifier (e.g., item number, serial number, etc.) of the counterfeit device, and/or one or more identifiers of one or more other devices associated with the counterfeit device, such as other devices manufactured, packaged, shipped, sold, etc. along with the counterfeit device.

Conversely, if the distributed device(s) 110 identify, from the representative models and/or the comparison results, that a user device 104 matches and/or is not counterfeit (e.g., not likely to be counterfeit), authorization (e.g., granting access to a profile, etc.), activation (e.g., enabling connection of the device to a network), and/or operation (e.g., remote activation) of the user device 104 can be managed accordingly (e.g., the authorization, the activation, and/or the operation can be performed), notifications can be presented, via the display of the supplier device(s) 106, that the user device 104 is not counterfeit, and/or a counterfeit flag can be left untriggered.

Although the supplier device(s) 106 may be associated the supplier, as discussed above in the current disclosure, it is not limited as such. One or more devices of any type associated with any type of party (e.g., an organization) may be utilized to perform any functions in a similar way for the supplier device(s) 106, to implement any of the techniques as discussed throughout the current disclosure.

Although individual ones of the sample device(s) 102 and/or individual ones of the user device(s) 104 may be a device that is a product, as discussed above in the current disclosure, it is not limited as such. One or more devices (e.g., computers, electrical devices therein, and so on, or any combination thereof) of any type that include one or more sensors for generating telemetry data, may be utilized in a similar way as for individual ones of the sample device(s) 102 and/or individual ones of the user device(s) 104, to implement any of the techniques as discussed throughout the current disclosure.

Although the user device(s) 104 may be tested, as discussed above in the current disclosure, it is not limited as such. In some examples, one or more other computing devices (e.g., devices, which may be associated with any parties of any types, and which may be similar to, and/or different from, the supplier device(s) 106) may be communicatively connected to the user device(s) 104 according to any connection types as discussed herein, and/or communicatively connected to one or more other devices (e.g., the supplier device(s) 106, the distributed device(s) 110, one or more other devices, and so on, or any combination thereof), to be utilized for testing the user device(s) 104, and/or for exchanging one or more communications with the other device(s), of any test related data (e.g., telemetry data, analysis results data, etc.) as discussed herein. One or more devices (e.g., the user device(s) 104) of any type may be tested and utilized for the tests along with any of the other computing device(s), to perform any functions in a similar way for the testing of the user device(s) 104, to implement any of the techniques as discussed throughout the current disclosure.

In some examples, any portions of the techniques as discussed above utilized for anti-counterfeit device management can be driven by one or more devices (e.g., user computing devices, the supplier device(s) 106, the distributed device(s) 110, one or more other devices, etc., or any combination thereof). In those or other examples, any portions of the techniques as discussed above utilized for anti-counterfeit device management can be driven based on executable files, software instructions, user selections via user input the user interfaces of any of the device(s), etc.

Figure 2:
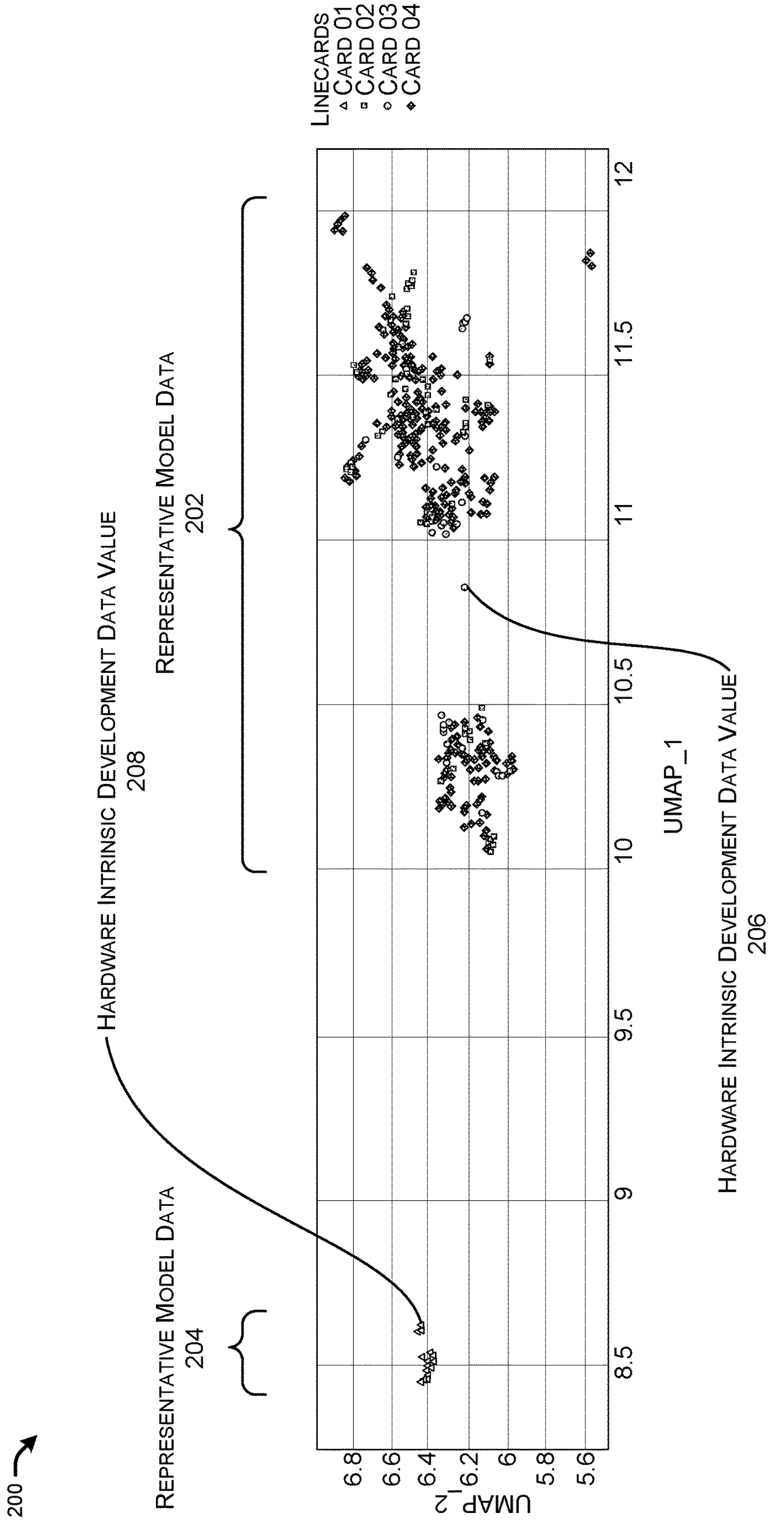
FIG. 2 illustrates an example graph of representative models of hardware intrinsic development data for authentic devices, and for a test device with one or more different printed circuit board (PCB) layers.

FIG. 2 illustrates an example graph 200 of representative models of hardware intrinsic development data for authentic devices, and for a test device with one or more different printed circuit board (PCB) layers. In some examples, the graph 200 can include representative model data 202 associated with one or more sample devices and/or one or more test devices (e.g., one or more of the sample device(s) 102 and/or one or more of the user device(s) 104, as discussed above with reference to FIG. 1). In those or other examples, the graph 200 can include representative model data 204 associated with a test device (e.g., one of the test device(s) 104, as discussed above with reference to FIG. 1).

By way of example, for instance with the representative model data 202 including data associated with a sample device 102, and data associated with two user devices 104 that are not counterfeit, the data in the representative model data 202 can be identified as including data points illustrated in FIG. 2 as triangles, for "Card 01;" and the data in the representative model data 202 can be identified as including data points illustrated in FIG. 2 as squares, for "Card 02." the data in the representative model data 202 can be identified as including data points illustrated in FIG. 2 as circles, for "Card 03." In such an example or another example, individual ones of the data points for the Linecards associated with the data in the representative model data 202 can include a hardware intrinsic development data value, such as a hardware intrinsic development data value 206 associated with "Card 03."

In such an example or another example, the representative model data 204 can include data associated with a user device 104 (e.g., which may be modified, counterfeit, etc.), the data in the representative model data 204 can be identified as including data points illustrated in FIG. 2 as diamonds, for "Card 04." In such an example or another example, individual ones of the data points for the Linecard associated with the data in the representative model data 204 can include a hardware intrinsic development data value, such as a hardware intrinsic development data value 208 associated with "Card 04."

The representative model data 202 can include data associated with a sample representative model of hardware intrinsic development data associated with the sample device 102. The sample representative model including data of the representative model data 202 associated with "Card 01" can be generated by a one or more machine learning (ML) models (e.g., one or more unsupervised ML models and/or one or more supervised ML models), for example, that processes sample telemetry data associated with the sample device 102, in a similar way as discussed above with reference to FIG. 1. The test representative models including data of the representative model data 202 associated with "Card 02" and "Card 03," respectively, can be generated by the ML model(s), for example, that processes sample telemetry data associated with the test devices 104 (e.g., which may be genuine, authentic, not counterfeit, etc.), in a similar way as discussed above with reference to FIG. 1.

In some examples, the ML model(s) can analyze the sample telemetry data associated with "Card 01," generate N-dimensional results analysis data based on the sample telemetry data associated with "Card 01," and convert the N-dimensional results analysis data to two-dimensional (2D) results analysis data, included in the representative model data 202. In those or other examples, the ML model(s) can analyze the test telemetry data associated with "Card 02" and "Card 03," respectively, generate N-dimensional results analysis data based on the test telemetry data associated with "Card 02" and "Card 03," and convert the N-dimensional results analysis data to 2D results analysis data, included in the representative model data 202.

In some examples, the ML model(s) can analyze the test telemetry data associated with "Card 04," generate N-dimensional results analysis data based on the test telemetry data associated with "Card 04." In those or other examples, the N-dimensional results analysis data can be converted to 2D results analysis data, included in the representative model data 204.

In some examples, the graph 200 can include units identified by the ML model(s). The ML model(s) can include, for example, one or more uniform manifold approximation and projection (UMAP) models, one or more t-distributed stochastic neighbor embedding (t-SNE) models, one or more rank metrics models, one or more autoencoding models, one or more principal component analysis (PCA) models, one or more of any other types of ML model, or any combination thereof. The ML model(s) (e.g., the UMAP) can generate x-axis units (e.g., x-axis ML model units) (e.g., x-axis UMAP_1 units) with values ranging from 8.5-12, and y-axis units (e.g., y-axis ML model units) (e.g., y-axis UMAP_2 units) with values ranging from 5.6-6.8. The units can be generated by the ML model(s) (e.g., the UMAP model) based on the results analysis data, for visually depicting the results analysis data on the graph 200. The x-axis units and y-axis units can be identified by the ML model(s) (e.g., the UMAP model) to include all of the data in the representative model data 202 and the representative model data 204, on the graph 200.

The representative model data 204 can include data associated with a test representative model of hardware intrinsic development data associated with the user device 104 (e.g., which may be counterfeit). The sample representative model including data of the representative model data 204 associated with "Card 04" can be generated by the ML model(s), for example, that processes test telemetry data associated with the user device 104 (e.g., which may be counterfeit), in a similar way as discussed above with reference to FIG. 1.

The representative model data 202 and the representative model data 204 can be utilized to determine that the user device 104 associated with the representative model data 204 is counterfeit. By way of example, the user device 104 associated with the representative model data 204 can be identified as being counterfeit by a comparison (e.g., a simple visual inspection) of the representative model data 202 and the representative model data 204.

In some examples, a comparison (e.g., an automated comparison) can be performed to identify differences between the sample representative model including sample analysis results data associated with "Card 01" in the representative model data 202, and the test representative model including test analysis results data associated with "Card 04" in the representative model data 204. In those or other examples, the automated comparison can be performed in a similar way as discussed above with reference to FIG. 1, such as by comparing one or more characteristics of the sample representative model (e.g., the representative model data 202), and one or more characteristics of the test representative model (e.g., the representative model data 204).

By way of example, the comparison (e.g., the visual comparison, the automated comparison, etc.) can be utilized to identify a first collection of data associated with the representative model data 202, and a second collection of data associated with the representative model data 204. In some examples, a characteristic of the first collection, which can include a range of data values from ML model units (e.g., UMAP units) of 10 to 12, can be identified as being different from a corresponding characteristic of the second collection, which can include a range of data values from ML model units (e.g., UMAP units) between 8.4 and 8.7.

The representative model data 204 including a single cluster, and the representative model data 202 including two clusters, can be utilized to identify "Card 04" as being counterfeit. In those or other examples, a characteristic of the first collection in the representative model data 202, which can include first and second clusters of data points, can be identified as being different from a corresponding characteristic of the second collection in the representative model data 204, which can include a third cluster of data points, based on x-axis values associated with the third cluster (e.g., an x-axis data value range between any of the third cluster data values) not overlapping with x-axis values associated with the first cluster (e.g., an x-axis data value range between any of the first cluster data values) or the second cluster (e.g., an x-axis data value range between any of the second cluster data values).

The representative model data 204 being clumped relatively more closely in a horizontal direction and in a vertical direction than the representative model data 202 can be utilized to identify "Card 04" as being counterfeit. In those or other examples, a characteristic of the first collection in the representative model data 202 can be identified as being different from a corresponding characteristic of the second collection in the representative model data 204, based on a difference between a span of outermost x-axis values associated with the representative model data 202, and a span of outermost x-axis values associated with the representative model data 204, being greater than a threshold difference. In those or other examples, a characteristic of the first collection in the representative model data 202 can be identified as being different from a corresponding characteristic of the second collection in the representative model data 204, based on a difference between a span of outermost y-axis values associated with the representative model data 202, and a span of outermost y-axis values associated with the representative model data 204, being greater than a threshold difference.

By way of example, sensor data being utilized to generate the telemetry data associated with "Card 04" may be different than sensor data being utilized to generate the telemetry data associated with "Card 01," "Card 02," and/or "Card 03," based on one or more electrical components (e.g., one or more printed circuit board layers) of "Card 04" having been modified (e.g., altered). In some examples, detection of "Card 04" may not be possible by conventional techniques, such as, based on visual inspection of the design of "Card 04" and/or the design of one or more of the components of "Card 04," and/or based on one or more functional tests of "Card 04" and/or of any components of "Card 04." However, the representative model data 202 and the representative model data 204 generated by the ML model(s) can reveal that "Card 04" is not the same (e.g., same type) (e.g., that "Card 04" has a different electrical "make-up," "hardware formulation," or "genetic composition") as "Card 01," for example, which can be utilized to perform a further detailed analysis and/or inspection of "Card 04" for identifying the alterations.

Figure 3A:
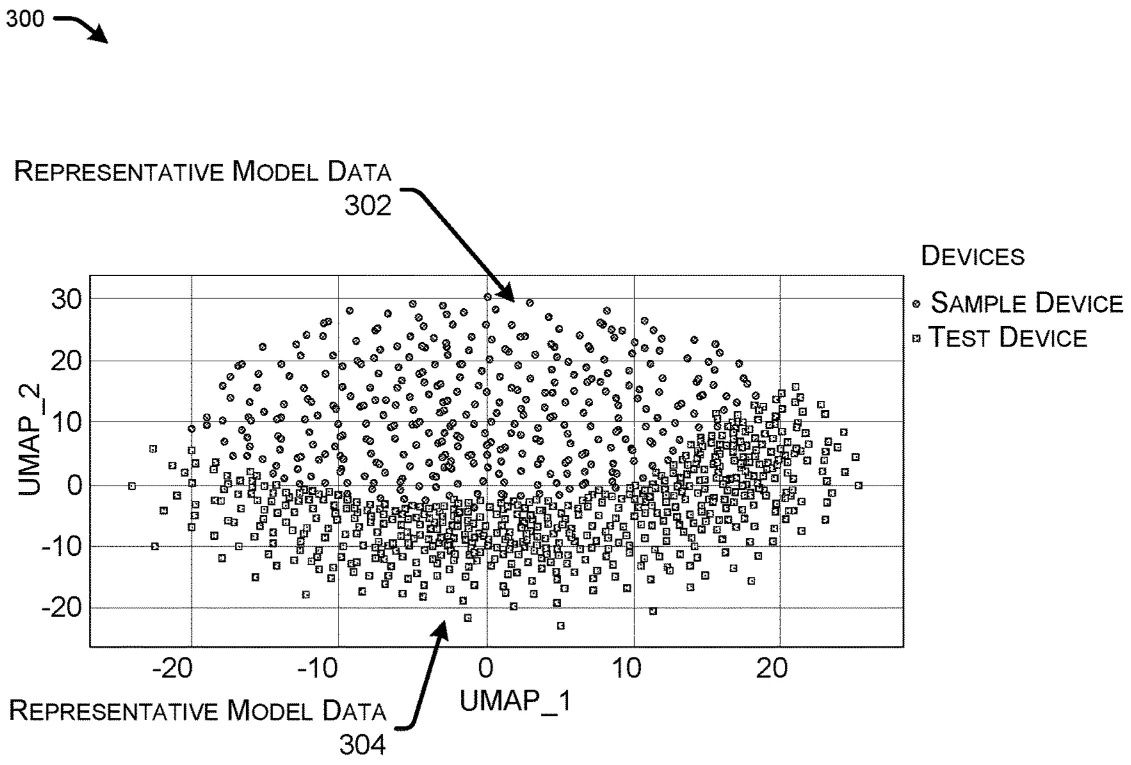
FIGS. 3A and 3B illustrate example graphs of representative models of hardware intrinsic development data for an authentic device, and for a test device with one or more different sub-devices.
Figure 3B:
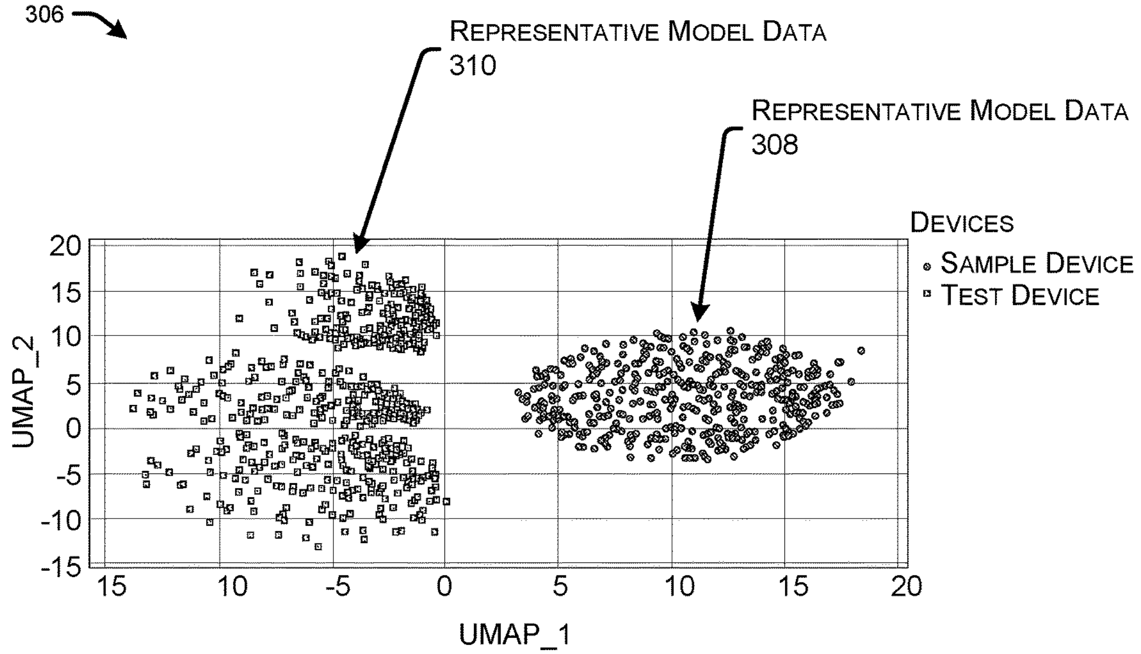

FIGS. 3A and 3B illustrate example graphs of representative models of hardware intrinsic development data for an authentic device, and for a test device with one or more different sub-devices. Referring to FIG. 3A, in some examples, a graph 300 can include representative model data 302 associated with a sample device (e.g., one of the sample device(s) 102, as discussed above with reference to FIG. 1) and a test device (e.g., one of the user device(s) 104, as discussed above with reference to FIG. 1). In those or other examples, the graph 400 can include representative model data 304 associated with a test device (e.g., one of the user device(s) 104, as discussed above with reference to FIG. 1).

By way of example, the data in the representative model data 302 can be identified as including data points illustrated in FIG. 3 as circles, for the sample device. In such an example or another example, for instance with the representative model data 304 including data associated with the user device 104 that is counterfeit, the data in the representative model data 304 can be identified as including data points illustrated in FIG. 3 as squares, for the test device. In such an example or another example, individual ones of the data points for the sample associated with the data in the representative model data 302 associated with the sample device 102 can include a two-dimensional (2D) hardware intrinsic development data value; and individual ones of the data points for the sample associated with the data in the representative model data 304 associated with the counterfeit user device 104 can include a 2D hardware intrinsic development data value.

In some examples, the graph 300 can be generated by one or more machine learning (ML) models (e.g., one or more unsupervised ML models and/or one or more supervised ML models) (e.g., one or more uniform manifold approximation and projection (UMAP) models, one or more t-distributed stochastic neighbor embedding (t-SNE) models, one or more rank metrics models, one or more auto-encoding models, one or more principal component analysis (PCA) models, one or more of any other types of ML model, or any combination thereof), with x-axis units and y-axis units, in a similar way as for the graph 200, as illustrated above with reference to FIG. 2. The graph 300 can be utilized for one or more comparisons (e.g., a manual visual inspections, an automated comparison, etc.) in a similar way as for the graph 200, as discussed above with reference to FIG. 2. In some examples, a comparison can be utilized to identify that the representative model data 302 is clumped and centered around a different y-value than the representative model data 304. In those or other examples, a characteristic the representative model data 302 can be identified as being different from a corresponding characteristic of the representative model data 304, based on a difference between a span of outermost y-axis values associated with the representative model data 302, and a span of outermost y-axis values associated with the representative model data 304, being greater than a threshold difference. In the comparison(s), for example, one or more "outlier" values not included as being grouped with a majority of other values can be extracted and/or discounted.

Referring to FIG. 3B, in some examples, a graph 306 can include representative model data 308 associated with the sample device 102 (e.g., the device associated with the representative model data 302), and representative model data 310 associated with the user device 104 (e.g., the device associated with representative model data 304). In some examples, the graph 306 can be generated by the ML model, such as the PCA mode and/or the UMAP model, etc., in a similar way as for the graph 300, except with the representative model data 308 and the representative model data 310 being oriented to according to a different perspective (e.g., a first perspective, such as a side-view perspective, a top-down perspective, etc.) and/or according to different batches of analysis results data of the analysis results data for the sample device 102 and the user device 104, respectively, than a perspective (e.g., a second perspective, such as a side-view perspective, a top-down perspective, etc.) and/or batches of analysis results data for the representative model data 302 and the representative model data 304. Comparisons between the representative model data 308 and the representative model data 310 can be performed similarly as for the comparisons between the representative model data 302 and the representative model data 304.

By way of example, sensor data collected from a number of sensors and being utilized to generate the telemetry data associated with the user device 104 may be different than sensor data collected from a same number of sensors and being utilized to generate the telemetry data associated with the sample device 102, based on one or more electrical components (e.g., one or more sub-components) (e.g., one or more components with a significance/importance level determined by the supplier as being less than or equal to a threshold significance/importance level) of the user device 104 being different than corresponding electrical components (e.g., sub-components) of the sample device 102. In some examples, detection of the different sub-components may not be possible by conventional techniques, such as, based on visual inspection of the design of the user device 104 and/or the design of one or more of the components of the user device 104, and/or based on one or more functional tests of the user device 104 and/or of any components of the user device 104. However, by performing a comparison between the representative model data 302 and the representative model data 304, and/or a comparison between the representative model data 308 and the representative model data 310, the ML model(s) can be utilized to reveal that the user device 104 is not the same (e.g., same type) as the sample device 102.

Figure 4:
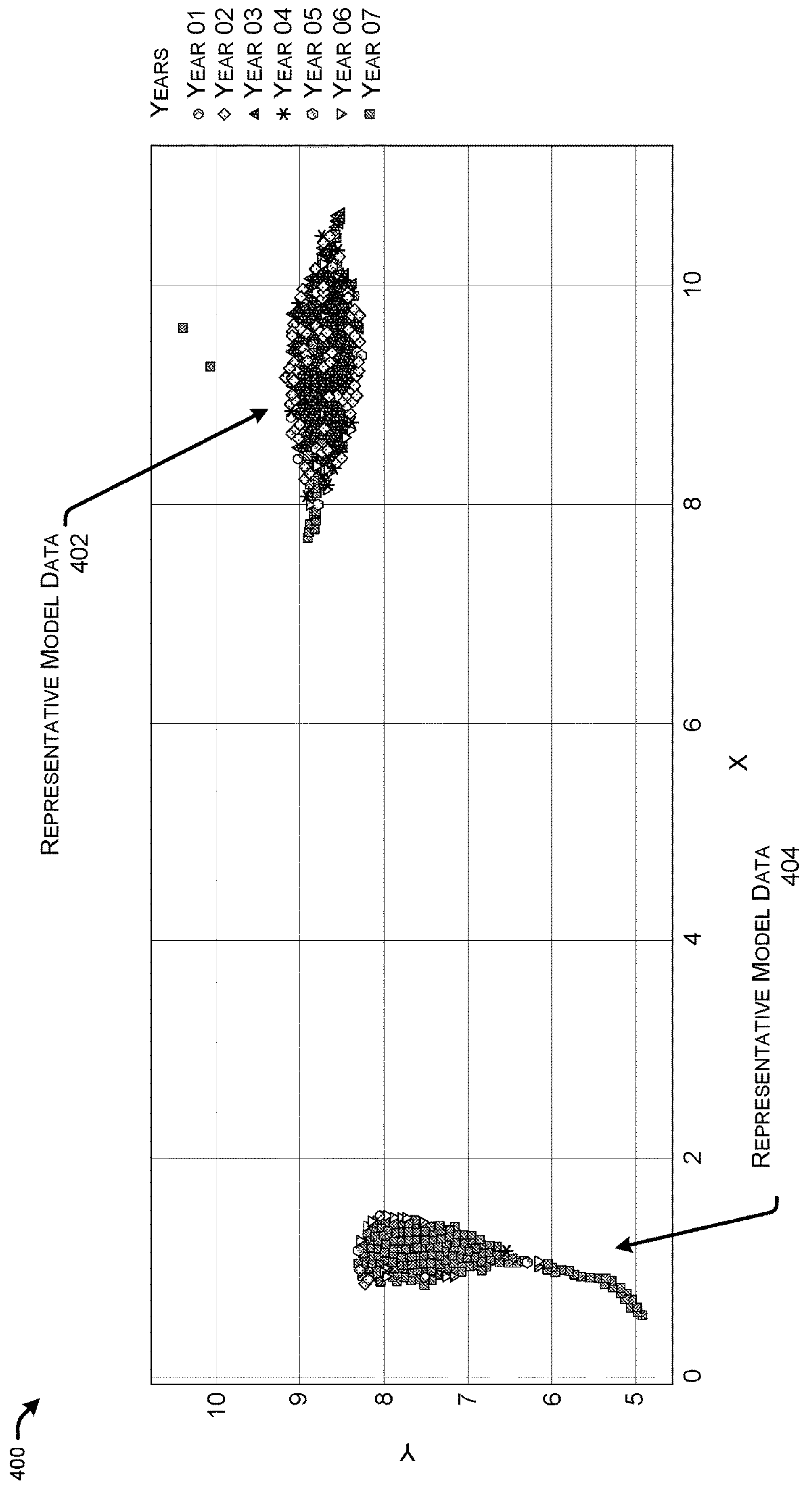
FIG. 4 illustrates an example graph of representative models of hardware intrinsic development data for authentic devices, with different computing processor units (CPUs) than a test device.

FIG. 4 illustrates an example graph 400 of one or more representative models of hardware intrinsic development data for authentic devices, with different computing processor units (CPUs) than a test device. In some examples, the graph 400 can include representative model data 402 associated with one or more sample devices (e.g., one or more of the sample device(s) 102, as discussed above with reference to FIG. 1) and one or more test devices (e.g., one or more of the user device(s) 104, as discussed above with reference to FIG. 1).

By way of example, the data in the representative model data 402 can be identified as including data points illustrated in FIG. 4 as circles, diamonds, triangles, stars, hexagons, and inverted triangles, for individual ones of the sample device(s) 102 and/or the user device(s) 104 including a component (e.g., electronic chip) (e.g., a CPU) associated with (e.g., made and/or manufactured in) one of "Year 01"-"Year 06." In such an example or another example, for instance with the representative model data 404 including data associated with the user device 104 that is counterfeit, the data in the representative model data 404 can be identified as including data points illustrated in FIG. 4 as squares, for the user device 104 including a component (e.g., a CPU) associated with (e.g., made and/or in) "Year 07" (e.g., "Year 07" can be an earlier year than any of "Year 01"-"Year 06).

In some examples, the graph 400 can be generated by one or more machine learning (ML) models (e.g., one or more unsupervised ML models and/or one or more supervised ML models) (e.g., one or more uniform manifold approximation and projection (UMAP) models, one or more t-distributed stochastic neighbor embedding (t-SNE) models, one or more rank metrics models, one or more auto-encoding models, one or more principal component analysis (PCA) models, one or more of any other types of ML model, or any combination thereof), with x-axis units and y-axis units, in a similar way as for the graph 200, as illustrated above with reference to FIG. 2. In some examples, a comparison can be utilized to identify that the representative model data 402 is arranged (e.g., clumped and centered around a different y-value) differently than the representative model data 404. In those or other examples, a comparison can be utilized to identify that the representative model data 402 is clumped and centered around a different x-value than the representative model data 404.

In those or other examples, a characteristic the representative model data 402 can be identified as being different from a corresponding characteristic of the representative model data 404, based on a difference between a span of outermost y-axis values associated with the representative model data 402, and a span of outermost y-axis values associated with the representative model data 404, being greater than a threshold difference (e.g., based on the representative model data 404 being vertically "longer," as viewed, than the representative model data 402). In those or other examples, a characteristic the representative model data 402 can be identified as being different from a corresponding characteristic of the representative model data 404, based on a difference between a span of outermost x-axis values associated with the representative model data 402, and a span of outermost x-axis values associated with the representative model data 404, being greater than a threshold difference (e.g., based on the representative model data 404 being horizontally "thinner." as viewed, than the representative model data 402). In any of the comparison(s), for example, one or more "outlier" values not included as being grouped with a majority of other values can be extracted and/or discounted.

By way of example, sensor data collected from a number of sensors and being utilized to generate the telemetry data associated with the counterfeit user device 104 may be different than sensor data collected from a same number of sensors and being utilized to generate the telemetry data associated with the sample device(s) 102, and/or the non-counterfeit user device(s) 104, based on the CPU of the counterfeit user device 104 being different than (e.g., made in a different year than) the CPU of the sample device(s) 102, and/or the non-counterfeit user device(s) 104. In some examples, detection of the counterfeit user device 104 may not be possible by conventional techniques, such as, based on visual inspection of the design of the counterfeit user device 104, and/or based on one or more functional (or "functional behavior") tests of the counterfeit user device 104 and/or of any components of the counterfeit user device 104.

For example, with respect to a physical inspection (e.g., the visual inspection), while the counterfeit user device 104 may include an electrical component (e.g., the CPU) that is physically/electrically different, the counterfeit user device 104 may still have a same external physical structure/framework, such as a same number and orientation of pins (e.g., a same pin compatibility), as a corresponding electrical component (e.g., the CPU) of any of the sample device(s) 102, and/or the non-counterfeit user device(s) 104). Functional tests may not distinguish the counterfeit user device 104 from the sample device 102. However, by performing a comparison between the representative model data 402 and the representative model data 404, the ML model(s) can be utilized to reveal that the counterfeit user device 104 is not the same (e.g., same, type) as any of the sample device(s) 102, and/or the non-counterfeit user device(s) 104, notwithstanding the difference being related to a seemingly and/or relatively unimportant/insignificant component.

Although data (e.g., analysis results data, representative model data, etc.) can be output by one or more devices (e.g., the supplier device(s) 106, the user device(s) 104 and/or the computing device(s) to which the user device(s) 104 are connected) based on the ML model(s) analysis, as discussed above in the current disclosure, it is not limited as such. In some examples, one or more comparisons can be performed to produce one or more results based on the output of the ML model(s), without presentation of any of the data (e.g., analysis results data, representative model data, etc.). The data (e.g., analysis results data, representative model data, etc.) can be generated and utilized for the comparison(s) without being output/presented.

In some implementations, one or more representation options can be selected via user input to one or more devices (e.g., the supplier device(s) 106, the user device(s) 104 and/or the computing device(s) to which the user device(s) 104 are connected) and utilized to analyze, via the ML model(s), the data (e.g., analysis results data, representative model data, etc.) and/or to generate the data using the representation option(s) based on the selection(s). In some cases, an automated computer system can be utilized to receive the selection(s) and/or to generate the data (e.g., the data using the selected representation option(s)). In various examples, the automated computing system can recommend recommended representation options presented to the user to make the selections. The automated computing system can recommend actions to be taken based on the analysis results, interpret the analysis results, etc. In some examples, the analysis can be performed and then the action(s) can be performed based on the user input (e.g., user input prior to the analysis) to select the recommended actions.

In various examples, users that provide input to the device(s) to request one or more detailed rationales and/or result scenarios (e.g., one or more descriptions of one or more possible and/or probable reasons for non-matching results, one more percentage chances of counterfeiting associated with counterfeit probability(ies), etc.). Based on the user input, the automated computing systems can, after the analysis by the ML model(s), cause presentation by the device(s) of the detailed rationale(s). The automated computing systems can cause presentation of the analysis results, the representative model data, the rationale(s), the result scenario(s), in-depth results data (e.g., in-depth details about one or more mechanisms of the analysis, such as the analysis by the ML model(s)), and/or the recommendation(s).

Although various types of presentation and/or transmission of messages (e.g., recommendation messages), receiving of user selections (e.g., user selections via user input based on the recommendations and/or user selections via user input without any recommendations being provided), performing of analysis, generating of the results data with different representations, outputting of recommendations, etc. can be performed with or without the representative model data being output/presented, as discussed above with reference to FIGS. 3A and 3B in the current disclosure, it is not limited as such. In some implementations, any of the types of presentation and/or transmission of messages (e.g., recommendation messages), receiving of user selections (e.g., user selections via user input based on the recommendations and/or user selections via user input without any recommendations being provided), performing of analysis, generating of the results data with different representations, outputting of recommendations, etc., with or without presentation of data (e.g., analysis results data, representative data, detailed results of ML model(s) output, etc.) of various types based on analysis by the ML model(s), can be utilized to implement any of the techniques discussed throughout this disclosure.

Figure 5A:
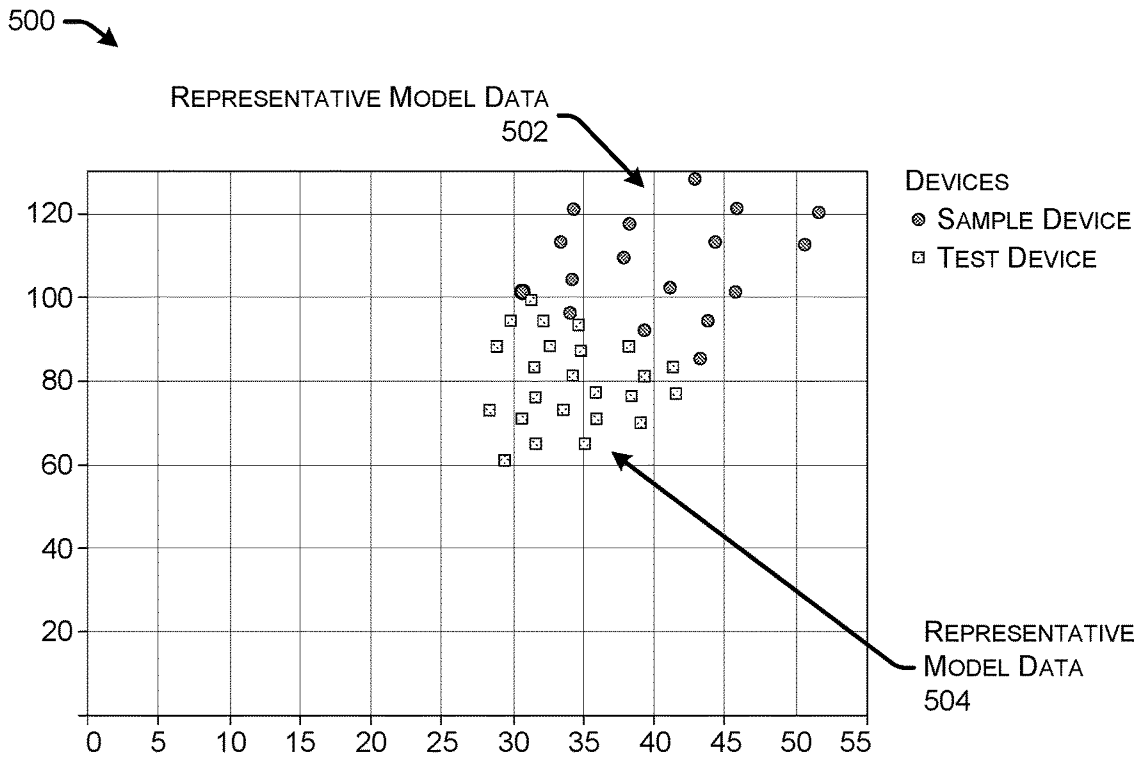
FIGS. 5A and 5B illustrate example two-dimensional (2D) and three-dimensional (3D) graphs, respectively, of representative models of hardware intrinsic development data for an authentic device, and a test device with one or more different electrical circuits.
Figure 5B:
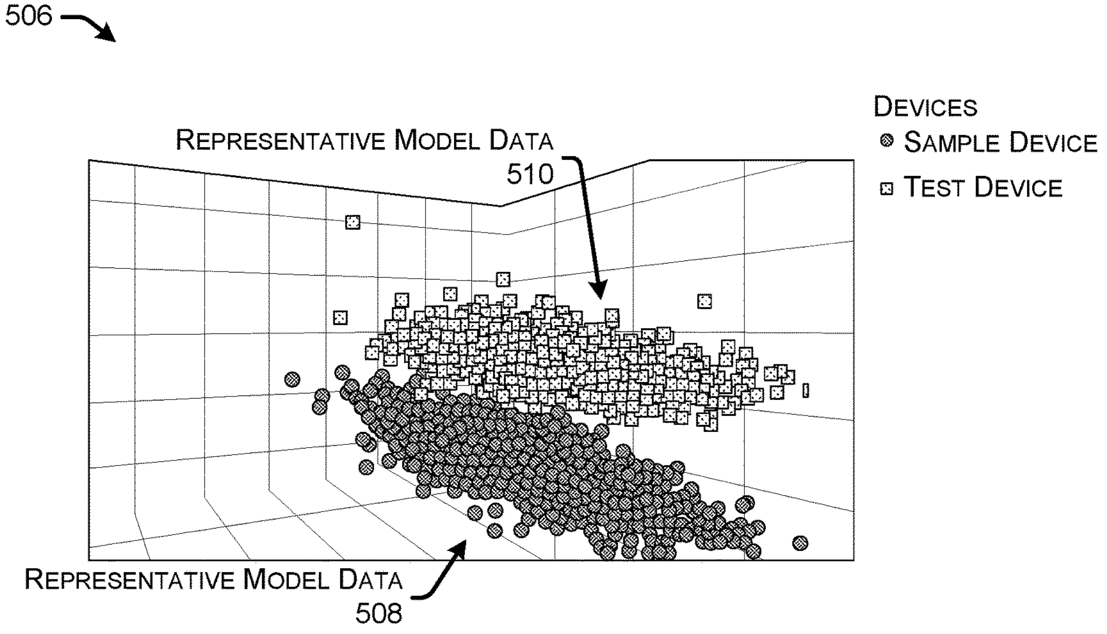

FIGS. 5A and 5B illustrate example two-dimensional (2D) and three-dimensional (3D) graphs, respectively, of representative models of hardware intrinsic development data for an authentic device, and a test device with one or more different electrical circuits. Referring to FIG. 5A, in some examples, a graph 500 can include representative model data 502 associated with a sample device (e.g., one of the sample device(s) 102, as discussed above with reference to FIG. 1), and representative model data 504 associated with a test device (e.g., one of the user device(s) 104, as discussed above with reference to FIG. 1). In some cases, each of the representative model data 502 and the representative model data 504 can include two-dimensional (2D) data (e.g., N-dimensional data generated based on telemetry data and converted to the 2D data).

In some examples, the graph 500 can be generated by one or more machine learning (ML) models (e.g., one or more unsupervised ML models and/or one or more supervised ML models) (e.g., one or more uniform manifold approximation and projection (UMAP) models, one or more t-distributed stochastic neighbor embedding (t-SNE) models, one or more rank metrics models, one or more auto-encoding models, one or more principal component analysis (PCA) models, one or more of any other types of ML model, or any combination thereof), with x-axis units and y-axis units, in a similar way as for the graph 200, as illustrated above with reference to FIG. 2. In some examples, a comparison can be utilized to identify that the representative model data 502 is arranged (e.g., clumped and centered around a different y-value) differently than the representative model data 504. In those or other examples, a comparison can be utilized to identify that the user device 104 is counterfeit, based on one or more different respective characteristics of the representative model data 502 and the representative model data 504. For example, the representative model data 502 may be arranged (e.g., clumped and centered around a different x-value (e.g., approximately 40)) differently than the representative model data 504 (e.g., approximately 34).

By way of example, the sample device 102, may be a hardware card (e.g., a network switch product supervisor card of a first version (e.g., a version of the SUP with a first optical link (e.g., a 25 gigabit per second ("Gbps") optical link)), and the counterfeit user device 104, may be a hardware card (e.g., a network switch product supervisor card) of a second version (e.g., a version with a second optical link (e.g., an optical link being less than 25 Gbps)). With respect to a physical inspection (e.g., a visual inspection), the counterfeit user device 104 may be physically/electrically different, but may still have a same external physical structure/framework as the sample device 102. However, by performing a comparison between the representative model data 402 and the representative model data 404, the ML model(s) can be utilized to reveal that the counterfeit user device 104 is not the same (e.g., same, type) as any of the sample device(s) 102, and/or the non-counterfeit user device(s) 104.

Referring to FIG. 5B, in some examples, a graph 506 can include representative model data 508 associated with the sample device 102 (e.g., the device associated with the representative model data 502), and representative model data 310 associated with the user device 104 (e.g., the device associated with the representative model data 304). In some examples, the graph 506 can be generated by the ML model(s), such as the PCA mode and/or the UMAP model, etc., in a similar way as for the graph 500, except with each of the representative model data 508 and the representative model data 510 being three-dimensional (3D) data. Comparisons between the representative model data 308 and the representative model data 310 can be performed similarly as for the comparisons between the representative model data 302 and the representative model data 304.

By using the graph 500 and/or the graph 506, and/or any of the data represented therein, and/or one or more comparisons (e.g., one or more automated and/or visual comparisons), the user device 104 can be identified as being counterfeit. In some examples, by using the graphs 500/506, the user device 104 can be identified as being counterfeit notwithstanding respective circuits of the sample device 102 and the user device 104 being otherwise indistinguishable. The user device 104, which may be slightly modified to a circuit of the user device 104 to bypass a certificate-based authentication or to convert a relatively cheaper model of the user device 104 into a relatively more expensive model of the user device 104 (e.g., a user, vendor, customer, etc. may modify a sample device to be the user device 104, to sell the user device 104 and obtain greater profits from the sale), can be identified as being counterfeit using one or more pairs of the representative models (e.g., representative models 502 and 504) (e.g., representative models data 508 and 510) of hardware intrinsic development data to identify the user device 104 as being counterfeit. By using the graphs 500/506 and the data associated therewith, hardware sensors of the sample device 102 and the user device 104, and the data obtained therewith, may be utilized to detect the user device 104 as being counterfeit.

Figure 6:
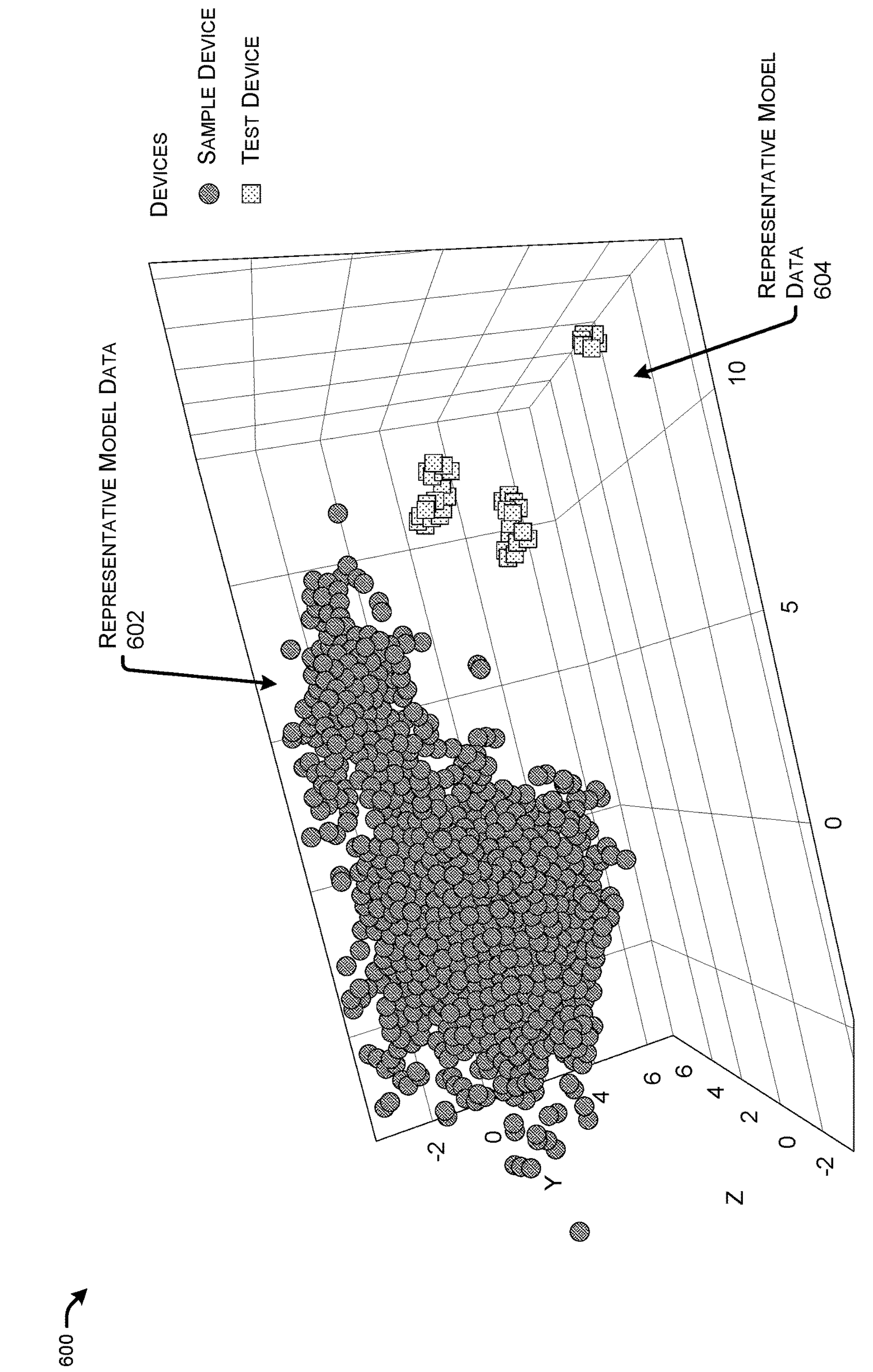
FIG. 6 illustrates an example graph of representative models of hardware intrinsic development data for an authentic device, and a test device with an implanted electrical sub-circuit.

FIG. 6 illustrates an example graph 600 of representative models of hardware intrinsic development data for an authentic device, and a test device with an implanted electrical sub-circuit. In some examples, the graph 600 can include representative model data 602 associated with a sample devices (e.g., one of the sample device(s) 102, as discussed above with reference to FIG. 1), representative model data 604 associated with and a test device (e.g., one of the user device(s) 104, as discussed above with reference to FIG. 1).

In some examples, the graph 600 can be generated by one or more machine learning (ML) models (e.g., one or more unsupervised ML models and/or one or more supervised ML models) (e.g., one or more uniform manifold approximation and projection (UMAP) models, one or more t-distributed stochastic neighbor embedding (t-SNE) models, one or more rank metrics models, one or more auto-encoding models, one or more principal component analysis (PCA) models, one or more of any other types of ML model, or any combination thereof), with x-axis units and y-axis units, in a similar way as for the graph 200, as illustrated above with reference to FIG. 2. For example, the representative model data 602 and the representative model data 604 can include three-dimensional (3D) data (e.g., N-dimensional data generated based on telemetry data and converted to the 3D data). In some examples, one or more comparisons (e.g., one or more automated comparisons and/or one or more manual visual comparisons) can include a comparison utilized to identify that the representative model data 602 is arranged (e.g., clumped and centered around a different y-value) differently than the representative model data 604. For example, the representative model data 604 may include three clusters (e.g., or two clusters, and some outlier data), whereas the representative model data 602 may include one cluster (e.g., one cluster, and some outlier data).

In those or other examples, a comparison can be utilized to identify that the user device 104 is counterfeit, based on one or more different respective characteristics of the representative model data 602 and the representative model data 604. For example, the representative model data 602 may be arranged (e.g., clumped and centered around a different x-value (e.g., approximately −3)) differently than the representative model data 504 (e.g., approximately 13).

By way of example, the sample device 102, may be a product, and the counterfeit user device 104, may be the same product (e.g., same product type) but with an implant circuit not included in the sample device 102. With respect to a physical inspection (e.g., a visual inspection), while the counterfeit user device 104 may be physically/electrically different, the counterfeit user device 104 may still have a same external physical structure/framework as the sample device 102. Functional tests may not distinguish the counterfeit user device 104 from the user device 102. However, by performing a comparison between the representative model data 602 and the representative model data 604, the ML model(s) can be utilized to reveal that the counterfeit user device 104 (e.g., the device with the implant circuit, which may be utilized to by-pass authentication tests, such as functional tests) is not the same (e.g., same, type) as the sample device 102 (e.g., the device without the implant circuit).

Figure 7:
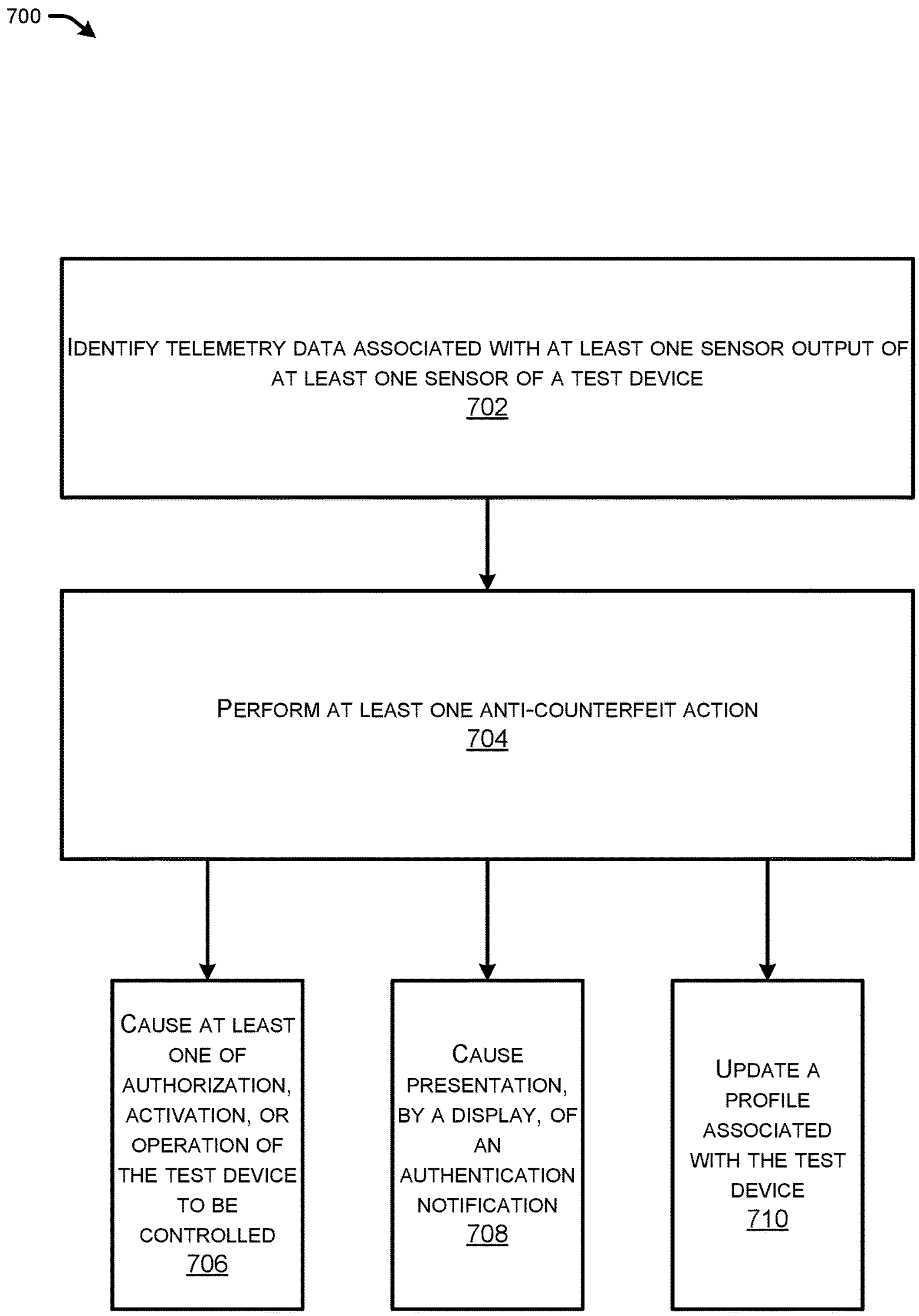
FIG. 7 illustrates a flow diagram of an example method that illustrates aspects of the functions performed at least partly by the devices in the anti-counterfeit device management architecture as described in FIG. 1.

FIG. 7 illustrates a flow diagram of an example method 700 that illustrates aspects of the functions performed at least partly by the devices in the anti-counterfeit device management architecture as described in FIG. 1. The anti-counterfeit device management architecture 108 may include the distributed device(s) 110.

At 702, the distributed device(s) 110 can identify telemetry data associated with at least one sensor output of at least one sensor of a test device. The at least one sensor output can be generated based on at least one sensor input to the at least one sensor. The telemetry data can be analyzed by a machine learning (ML) model that outputs a test representative model with at least one representative data value associated with the test device. The test representative model can be compared with a sample representative model associated with a genuine device.

At 704, the distributed device(s) 110 can perform at least one anti-counterfeit action that includes at least one of i) causing at least one of authorization, activation, or operation of the test device to be controlled; ii) causing presentation, by a display, of an authentication notification; or iii) updating a profile associated with the test device.

At 706, the distributed device(s) 110 can, based on the at least one anti-counterfeit action including causing the at least one of the authorization, the activation, or the operation of the test device to be controlled, cause the at least one of the authorization, the activation, or the operation of the test device to be controlled, based at least in part on a result of the test representative model being compared with the sample representative model.

At 708, the distributed device(s) 110 can, based on the at least one anti-counterfeit action including causing presentation, by the display, of the authentication notification, cause presentation, by the display, of the authentication notification based at least in part on whether the test representative model matches the sample representative model. The display presenting the authentication notification can be included in one or more devices, such as a supplier device (e.g., one of the supplier device(s) 106, as discussed above with reference to FIG. 1).

At 710, the distributed device(s) 110 can, based on the at least one anti-counterfeit action including updating the profile associated with the test device, update the profile associated with the test device by setting a flag in the profile to communicate and/or present a notification that the test device is counterfeit.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less, or more, components.

Figure 8:
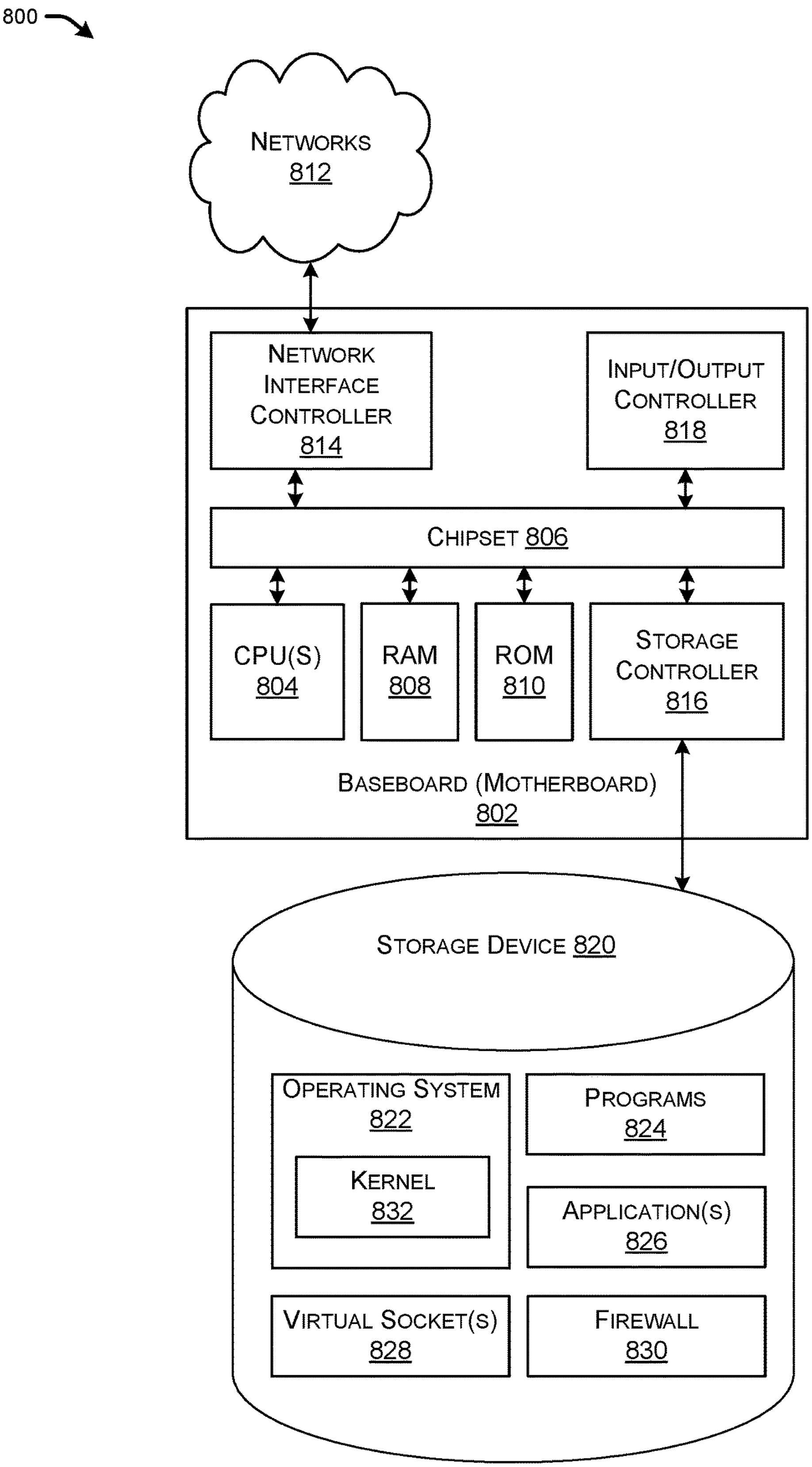
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture 800 for implementing a computing device that can be utilized to implement aspects of the various technologies presented herein. For example, the computer hardware architecture 800 can be utilized to implement one or more computing devices (e.g., the supplier device(s) 106 and/or the distributed device(s) 110, as discussed above with reference to FIG. 1).

The computer architecture shown in FIG. 8 illustrates a conventional server computer, workstation, desktop computer, laptop, tablet, network appliance, e-reader, smartphone, or other computing device, and can be utilized to execute any of the software components presented herein. The computer hardware architecture (or "computer") 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a random-access memory (RAM) 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through one or more networks, such as one or more networks 812. The chipset 806 can include functionality for providing network connectivity through a network interface controller (NIC) 816, such as a gigabit Ethernet adapter. The NIC 816 is capable of connecting the computer 800 to other computing devices over the network(s) 812. It should be appreciated that multiple NICs 816 can be present in the computer 800, connecting the computer 800 to other types of networks and remote computer systems. In some instances, the NICs 816 may include at least on ingress port and/or at least one egress port.

The computer 800 can be connected to a storage device 820 that provides non-volatile storage for the computer. The storage device 820 can store an operating system 822, programs 824, and data, which have been described in greater detail herein. The storage device 820 can be connected to the computer 800 through a storage controller 814 connected to the chipset 806. The storage device 820 can consist of one or more physical storage units. The storage controller 814 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 800 can store data on the storage device 820 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 820 is characterized as primary or secondary storage, and the like.

For example, the computer 800 can store information to the storage device 820 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 820 by detecting the physical states or characteristics of one or more particular locations within the physical storage units.

In addition to the mass storage device 820 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by any network node described herein may be supported by one or more devices similar to computer 800. Stated otherwise, some or all of the operations performed by a network node may be performed by one or more computers (or "computer devices") 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 820 can store an operating system 822 utilized to control the operation of the computer 800. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 820 can store other system or application programs and data utilized by the computer 800.

In one embodiment, the storage device 820 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

As illustrated in FIG. 8, the storage device 820 stores an operating system 822, one or more programs 824, which may include one or more processes, as well as one or more applications 826, one or more virtual sockets 828, and a firewall 830 described above. The operating system 822 may further include a kernel 832 descried above. The operating system 822, the programs 824, one or more applications 826, one or more virtual sockets 828, and a firewall 830 may include instructions that, when executed by the CPU(s) 804, cause the computer 800 and/or the CPU(s) 804 to perform one or more operations.

The computer 800 can also include one or more input/output controllers 818 for receiving and processing input from a number of input devices, such as a keyboard, a mouse, a touchpad, a touch screen, an electronic stylus, or other type of input device. Similarly, an input/output controller 818 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

storing, in a device management system, (i) an identifier associated with a genuine device that has been authenticated as being genuine and (ii) a first sensor output generated by a first hardware sensor of the genuine device in response to a first sensor input;

receiving, at a second hardware sensor of a test device, a second sensor input that corresponds to the first sensor input, the second hardware sensor corresponding to the first hardware sensor;

identifying a second sensor output generated by the second hardware sensor based on the second sensor input;

comparing a test representative model associated with the second sensor output with a corresponding representative model associated with the first sensor output, wherein the comparing comprises:

determining at least two similarity levels between at least two characteristics of the test representative model with at least two corresponding characteristics of the corresponding representative model, the at least two characteristics of the test representative model comprising at least two of a pattern, a distribution, a shape, or a size associated with the test representative model; and comparing the at least two similarity levels with at least two predetermined thresholds; and determining, based at least in part on a similarity level of the at least two similarity levels being less than a corresponding predetermined threshold of the at least two predetermined thresholds, that the test device includes a counterfeit component based at least in part on the second sensor output being different than the first sensor output.

2. The method of claim 1, wherein the second hardware sensor includes at least one of a voltage sensor detecting a voltage input, a current sensor detecting a current input, a temperature sensor detecting a temperature input, a fan speed sensor detecting a fan speed input, or a power sensor detecting a power input, wherein the at least one of the voltage sensor, the current sensor, the temperature sensor, the fan speed sensor, or the power sensor are soldered on a printed circuit board (PCB) within the test device, and wherein the second sensor output is at least one of an output of the voltage sensor, an output of the current sensor, an output of the temperature sensor, an output of the fan speed sensor, or an output of the power sensor, the second sensor output being used to determine whether the test device is counterfeit.

3. The method of claim 2, wherein the second sensor output is generated at run-time of the test device.

4. The method of claim 1, further comprising:

analyzing, by a specific model, the second sensor output to generate N-dimensional data, with N being greater than or equal to 2;

converting the N-dimensional data to two-dimensional (2D) data; and outputting the test representative model as a scatter plot of the 2D data.

5. The method of claim 4, wherein the specific model includes at least one of a uniform manifold approximation and projection (UMAP) model, a t-distributed stochastic neighbor embedding (t-SNE) model, a rank metrics model, an auto-encoding model, or a principal component analysis (PCA) model.

6. The method of claim 1, further comprising:

transmitting, to a computing device connected to the test device, an authentication response comprising an alert notification that the test device includes the counterfeit component.

7. The method of claim 1, further comprising:

causing presentation of a test result notification by a display of an external device, the test result notification including an indication that the test device includes the counterfeit component.

8. A system, comprising:

one or more processors; and one or more non-transitory computer-readable media storing computer-executable instructions that, when executed by the one or more processors, cause the one or more processors to perform operations comprising:

storing, in a device management system, (i) an identifier associated with a genuine device that has been authenticated as being genuine and (ii) a first sensor output generated by a first hardware sensor of the genuine device in response to a first sensor input;

receiving, at a second hardware sensor of a test device, a second sensor input that corresponds to the first sensor input, the second hardware sensor corresponding to the first hardware sensor;

identifying a second sensor output generated by the second hardware sensor based on the second sensor input;

comparing a test representative model associated with the second sensor output with a corresponding representative model associated with the first sensor output, wherein the comparing comprises;

determining at least two similarity levels between at least two characteristics of the test representative model with at least t two corresponding characteristics of the corresponding representative model, the at least two characteristics of the test representative model comprising at least two of a pattern, a distribution, a shape, or a size associated with the test representative model; and comparing the at least two similarity levels with at least two predetermined thresholds; and determining, based at least in part on a similarity level of the at least two similarity levels being less than a corresponding predetermined threshold of the at least two predetermined thresholds, that the test device includes a counterfeit component based at least in part on the second sensor output being different than the first sensor output.

9. The system of claim 8, wherein the second hardware sensor includes at least one of a voltage sensor detecting a voltage input, a current sensor detecting a current input, a temperature sensor detecting a temperature input, a fan speed sensor detecting a fan speed input, or a power sensor detecting a power input, wherein the at least one of the voltage sensor, the current sensor, the temperature sensor, the fan speed sensor, or the power sensor are soldered on a printed circuit board (PCB) within the test device, and wherein the second sensor output is at least one of an output of the voltage sensor, an output of the current sensor, an output of the temperature sensor, an output of the fan speed sensor, or an output of the power sensor, the second sensor output being used to determine whether the test device is counterfeit.

10. The system of claim 9, wherein the second sensor output is generated at run-time of the test device.

11. The system of claim 8, the operations further comprising:

analyzing, by a specific model, the second sensor output to generate N-dimensional data, with N being greater than or equal to 2;

converting the N-dimensional data to two-dimensional (2D) data; and outputting the test representative model as a scatter plot of the 2D data.

12. The system of claim 11, wherein the specific model includes at least one of a uniform manifold approximation and projection (UMAP) model, a t-distributed stochastic neighbor embedding (t-SNE) model, a rank metrics model, an auto-encoding model, or a principal component analysis (PCA) model.

13. The system of claim 8, the operations further comprising:

transmitting, to a computing device connected to the test device, an authentication response comprising an alert notification that the test device includes the counterfeit component.

14. The system of claim 8, the operations further comprising:

causing presentation of a test result notification by a display of an external device, the test result notification including an indication that the test device includes the counterfeit component.

15. A distributed application system hosting an application service, the distributed application system comprising:

one or more processors; and one or more non-transitory computer-readable media storing computer-executable instructions that, when executed by the one or more processors, cause the one or more processors to perform operations comprising:

storing (i) an identifier associated with a genuine device that has been authenticated as being genuine and (ii) a first sensor output generated by a first hardware sensor of the genuine device in response to a first sensor input;

receiving, at a second hardware sensor of a test device, a second sensor input that corresponds to the first sensor input, the second hardware sensor corresponding to the first hardware sensor;

identifying a second sensor output generated by the second hardware sensor based on the second sensor input;

comparing a test representative model associated with the second sensor output with a corresponding representative model associated with the first sensor output, wherein the comparing comprises;

determining at least two similarity levels between at least two characteristics of the test representative model with at least two corresponding characteristics of the corresponding representative model, the at least two characteristics of the test representative model comprising at least two of a pattern, a distribution, a shape, or a size associated with the test representative model; and comparing the at least two similarity levels with at least two predetermined thresholds; and determining, based at least in part on a similarity level of the at least two similarity levels being less than a corresponding predetermined threshold of the at least two predetermined thresholds, that the test device includes a counterfeit component based at least in part on the second sensor output being different than the first sensor output.

16. The distributed application system of claim 15, wherein the second hardware sensor includes at least one of a voltage sensor detecting a voltage input, a current sensor detecting a current input, a temperature sensor detecting a temperature input, a fan speed sensor detecting a fan speed input, or a power sensor detecting a power input, wherein the at least one of the voltage sensor, the current sensor, the temperature sensor, the fan speed sensor, or the power sensor are soldered on a printed circuit board (PCB) within the test device, and wherein the second sensor output is at least one of an output of the voltage sensor, an output of the current sensor, an output of the temperature sensor, an output of the fan speed sensor, or an output of the power sensor, the second sensor output being used to determine whether the test device is counterfeit.

17. The distributed application system of claim 16, wherein the second sensor output is generated at run-time of the test device.

18. The distributed application system of claim 15, the operations further comprising:

analyzing, by a specific model, the second sensor output to generate N-dimensional data, with N being greater than or equal to 2;

converting the N-dimensional data to two-dimensional (2D) data; and outputting the test representative model as a scatter plot of the 2D data.

19. The distributed application system of claim 18, wherein the specific model includes at least one of a uniform manifold approximation and projection (UMAP) model, a t-distributed stochastic neighbor embedding (t-SNE) model, a rank metrics model, an auto-encoding model, or a principal component analysis (PCA) model.

20. The distributed application system of claim 15, the operations further comprising:

transmitting, to a computing device connected to the test device, an authentication response comprising an alert notification that the test device includes the counterfeit component.

* * * * *